United States Patent
Berard et al.

(10) Patent No.: US 10,960,645 B2
(45) Date of Patent: Mar. 30, 2021

(54) VEHICULAR LUMINOUS LAMINATED GLAZED ROOF, VEHICLE INCORPORATING SAME AND MANUFACTURE

(71) Applicant: SAINT-GOBAIN GLASS FRANCE, Courbevoie (FR)

(72) Inventors: Mathieu Berard, Paris (FR); Olivier Delrieu, Epinay sur Orge (FR); Pascal Bauerle, Roye (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 129 days.

(21) Appl. No.: 16/304,543

(22) PCT Filed: May 24, 2017

(86) PCT No.: PCT/FR2017/051294
§ 371 (c)(1),
(2) Date: Nov. 26, 2018

(87) PCT Pub. No.: WO2017/203175
PCT Pub. Date: Nov. 30, 2017

(65) Prior Publication Data
US 2019/0299566 A1 Oct. 3, 2019

(30) Foreign Application Priority Data
May 26, 2016 (FR) ..................... 16 00852

(51) Int. Cl.
*B32B 3/10* (2006.01)
*B32B 17/10* (2006.01)
(Continued)

(52) U.S. Cl.
CPC ........ *B32B 17/10036* (2013.01); *B32B 17/00* (2013.01); *B32B 17/10293* (2013.01);
(Continued)

(58) Field of Classification Search
None
See application file for complete search history.

(56) References Cited

U.S. PATENT DOCUMENTS

2013/0299856 A1* 11/2013 Verger ................. B60Q 3/208
257/88
2015/0146286 A1 5/2015 Hagen et al.
2015/0151675 A1* 6/2015 Lefevre ............... B32B 17/1011
362/520

FOREIGN PATENT DOCUMENTS

EP 0 844 075 5/1998
FR 2 997 648 A1 5/2014
(Continued)

OTHER PUBLICATIONS

Machine translation of FR-2997648-A1 (Year: 2014).*
International Search Report as issued in International Patent Application No. PCT/FR2017/051294, dated Oct. 2, 2017.

*Primary Examiner* — Christopher M Polley
(74) *Attorney, Agent, or Firm* — Pillsbury Winthrop Shaw Pittman LLP

(57) ABSTRACT

A luminous laminated glazed roof of a vehicle includes a first glazing, forming an exterior glazing, with first and second main faces; a lamination interlayer made of polymeric material of thickness e1 of at most 1.8 mm; a second glazing, forming an interior glazing, with third and fourth main faces, the second and third main faces being the internal faces of the laminated glazing; a lamination interlayer with through or blind apertures housing diodes; and collimating optics between the diodes and the third main face.

20 Claims, 16 Drawing Sheets

(51) Int. Cl.
*B60Q 3/208* (2017.01)
*B62D 25/06* (2006.01)
*B32B 17/00* (2006.01)

(52) U.S. Cl.
CPC ........ *B32B 17/10541* (2013.01); *B60Q 3/208* (2017.02); *B62D 25/06* (2013.01); *B32B 17/10357* (2013.01); *B32B 2605/006* (2013.01); *Y10T 428/24868* (2015.01)

(56) References Cited

FOREIGN PATENT DOCUMENTS

| | | | |
|---|---|---|---|
| FR | 2997648 A1 * | 5/2014 | ............. B60Q 3/208 |
| WO | WO 2012/025685 | 3/2012 | |
| WO | WO 2013/110885 A1 | 8/2013 | |
| WO | WO 2013/175101 | 11/2013 | |
| WO | WO 2013/189794 | 12/2013 | |
| WO | WO 2015/031594 | 3/2015 | |
| WO | WO 2015/066201 | 5/2015 | |
| WO | WO 2015/079159 | 6/2015 | |
| WO | WO 2016/001508 A1 | 1/2016 | |

* cited by examiner

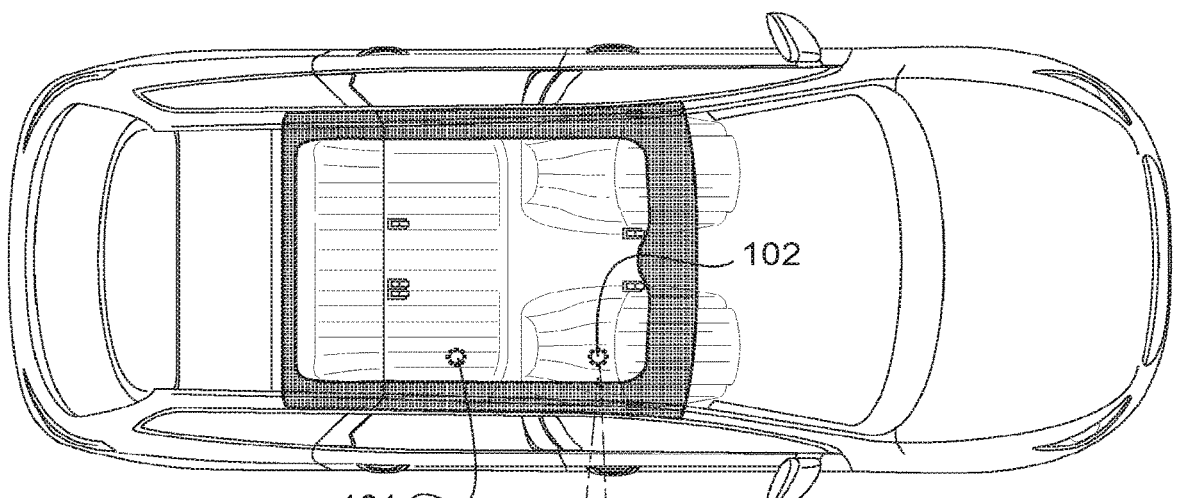
Fig.1
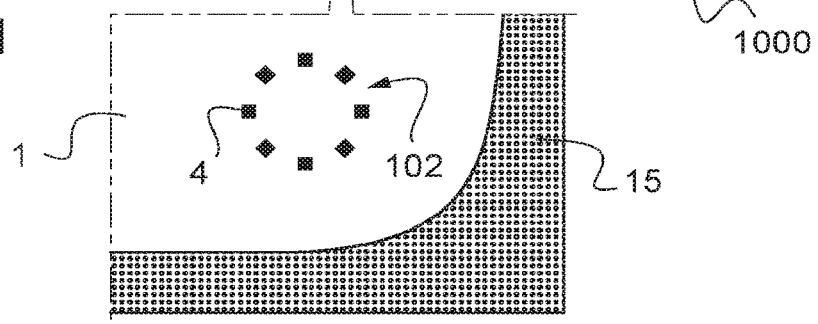
Fig.1'
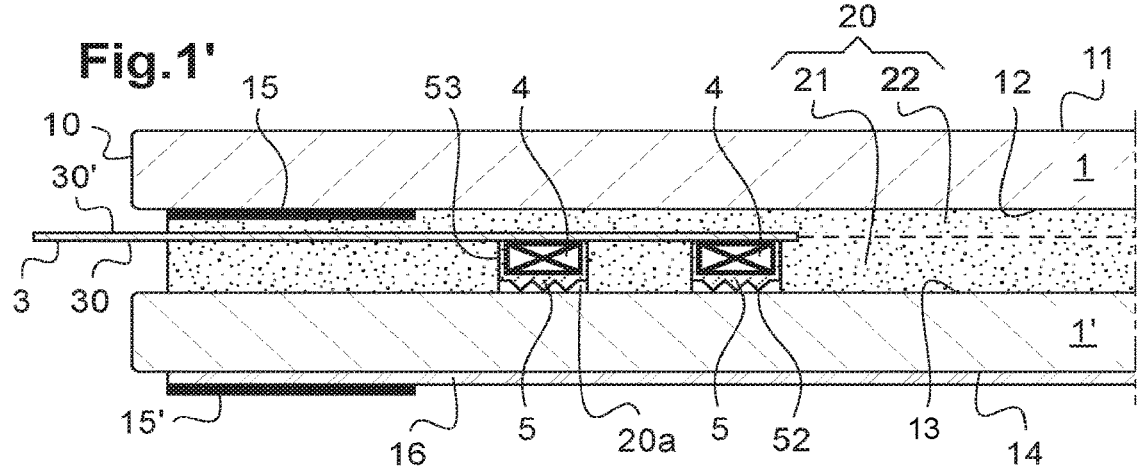
Fig.1"
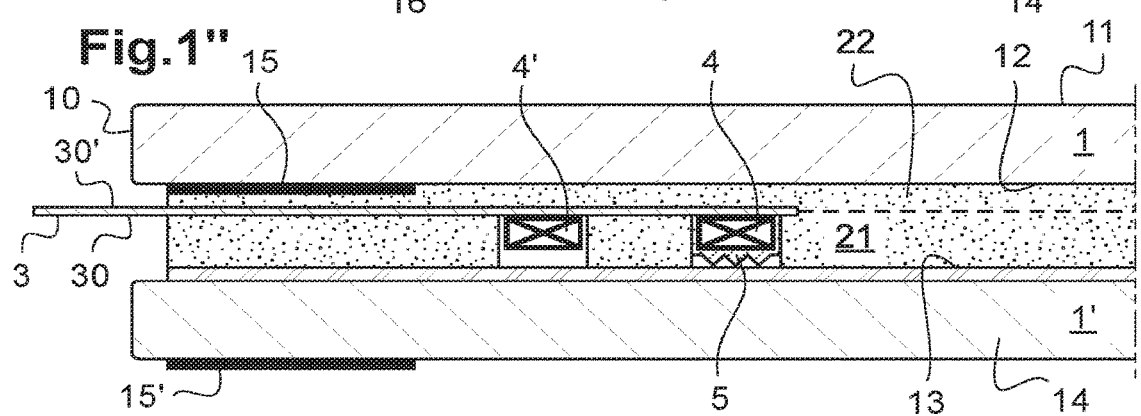

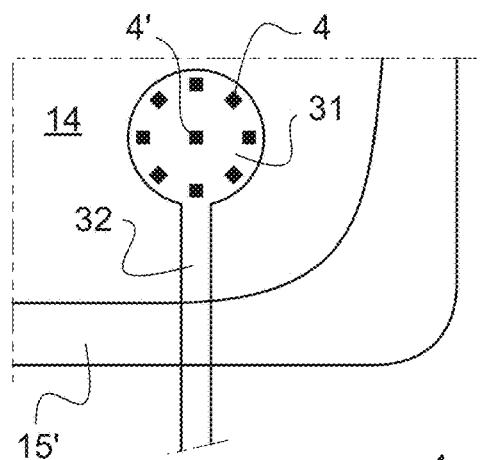
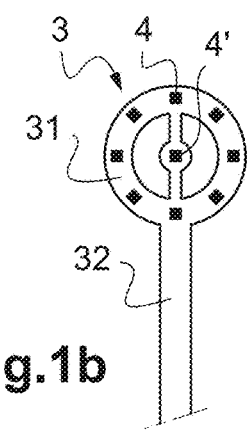
Fig.1a
Fig.1b
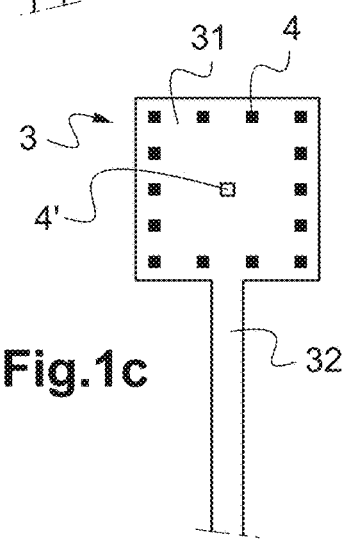
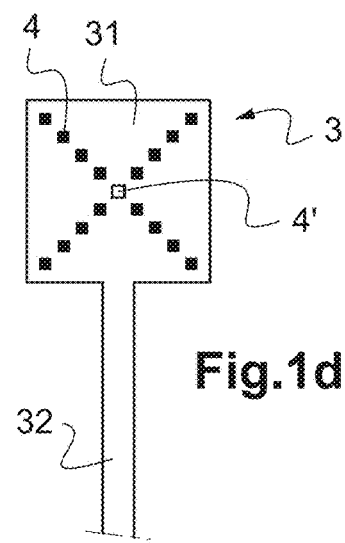
Fig.1c
Fig.1d
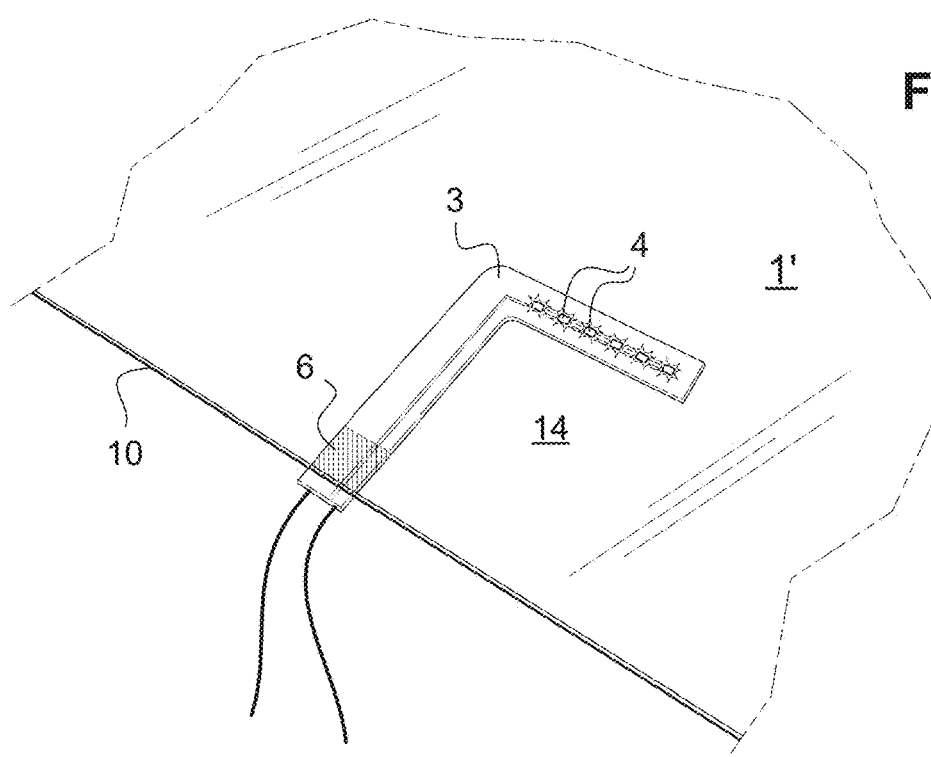
Fig.1e

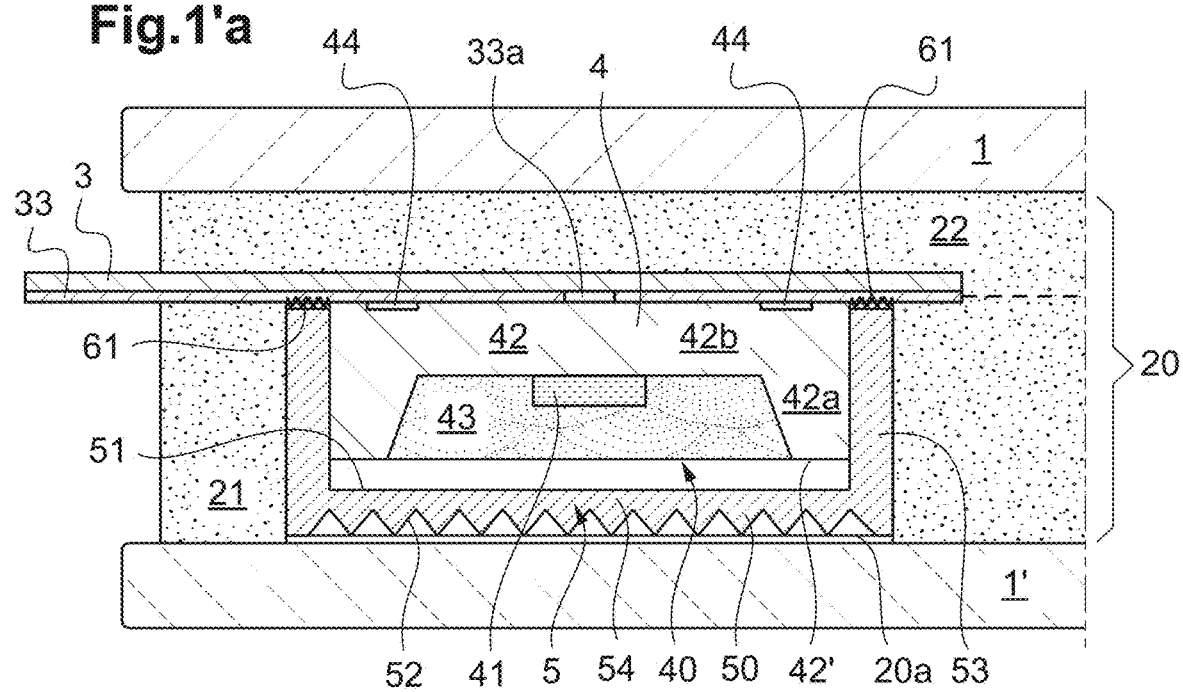
Fig.1'a
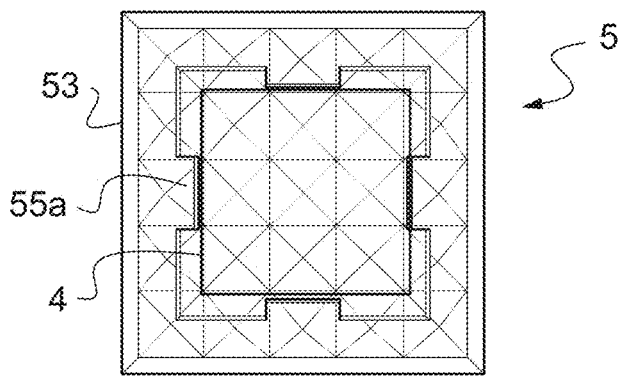
Fig.1'b
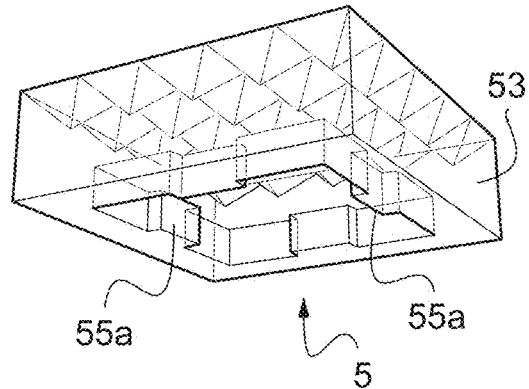
Fig.1'c
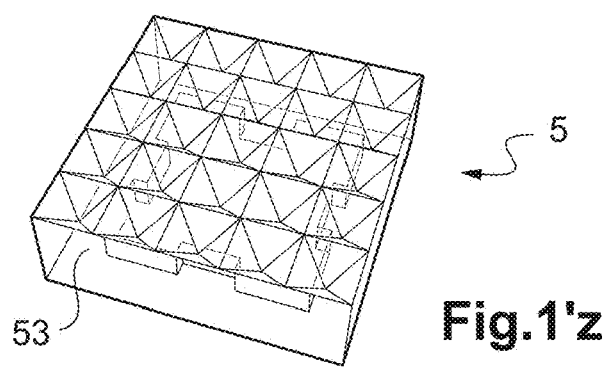
Fig.1'z

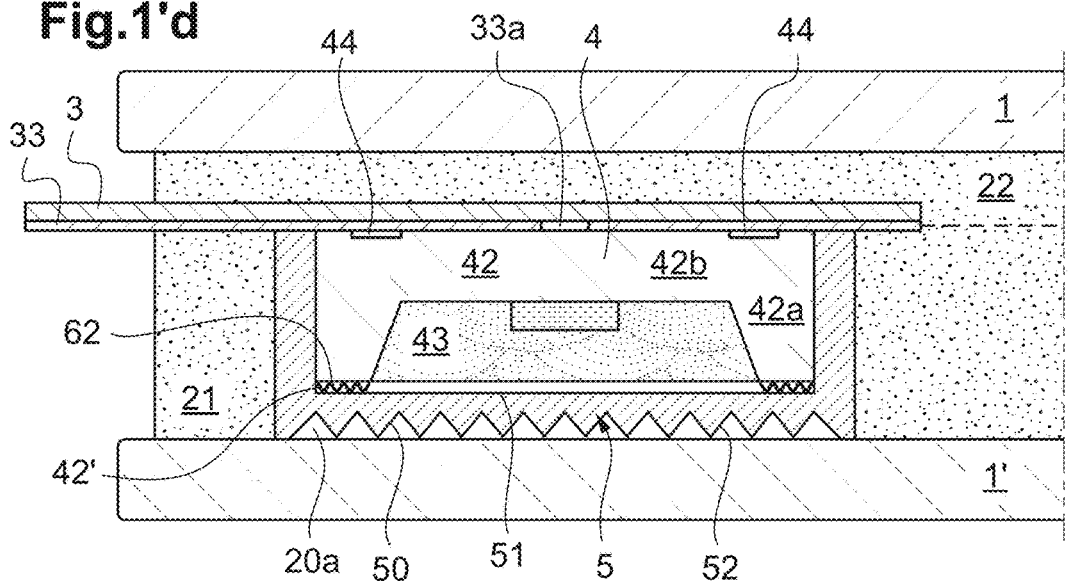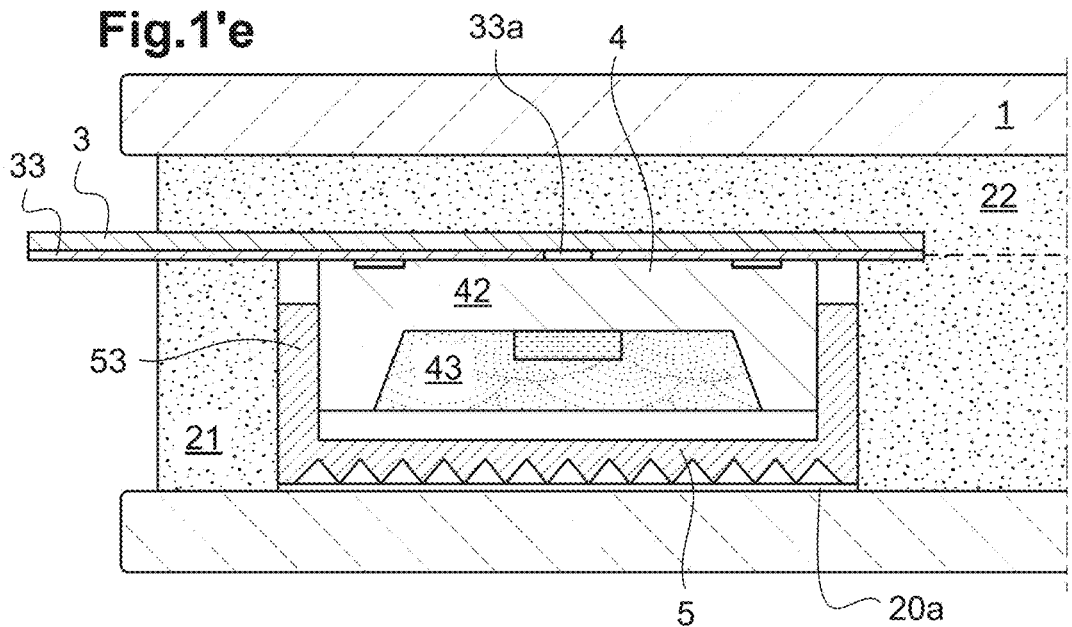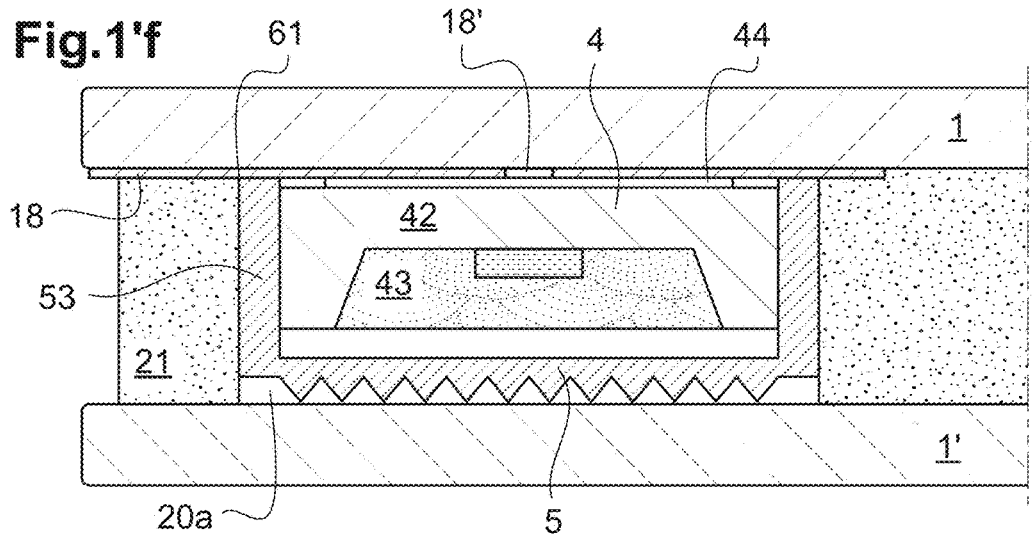

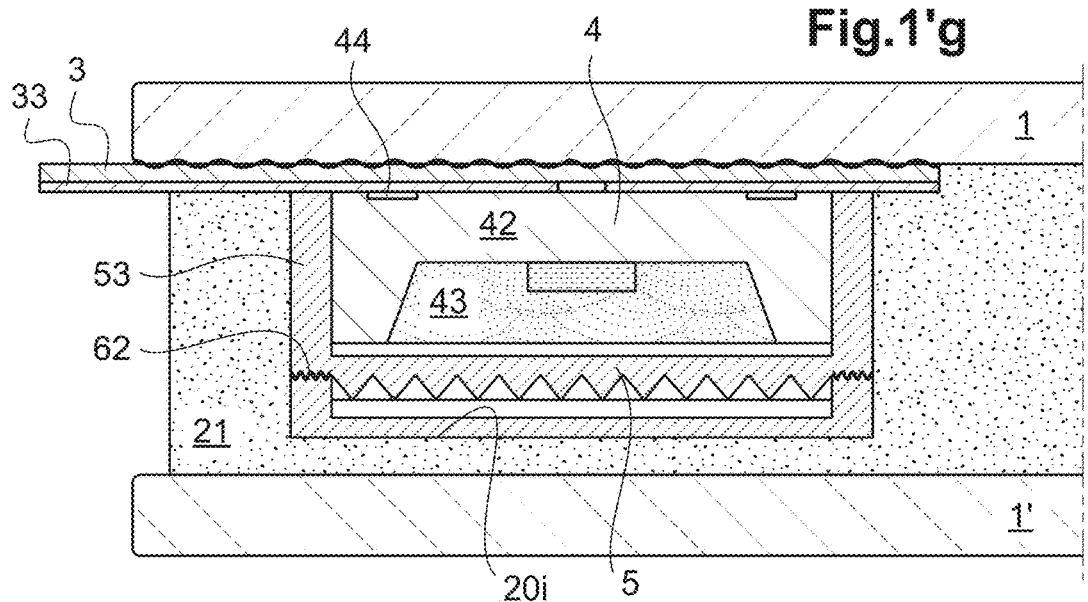
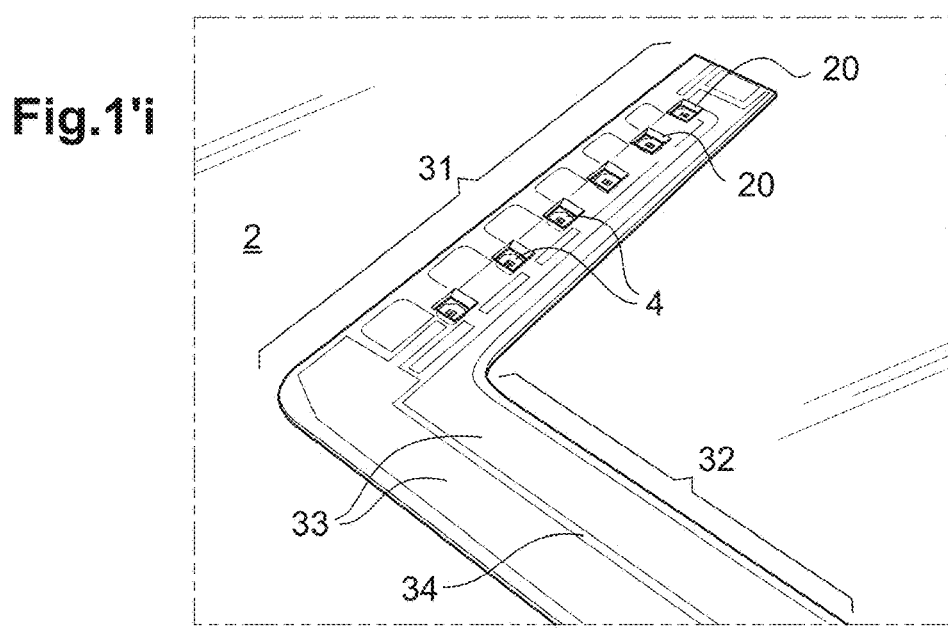
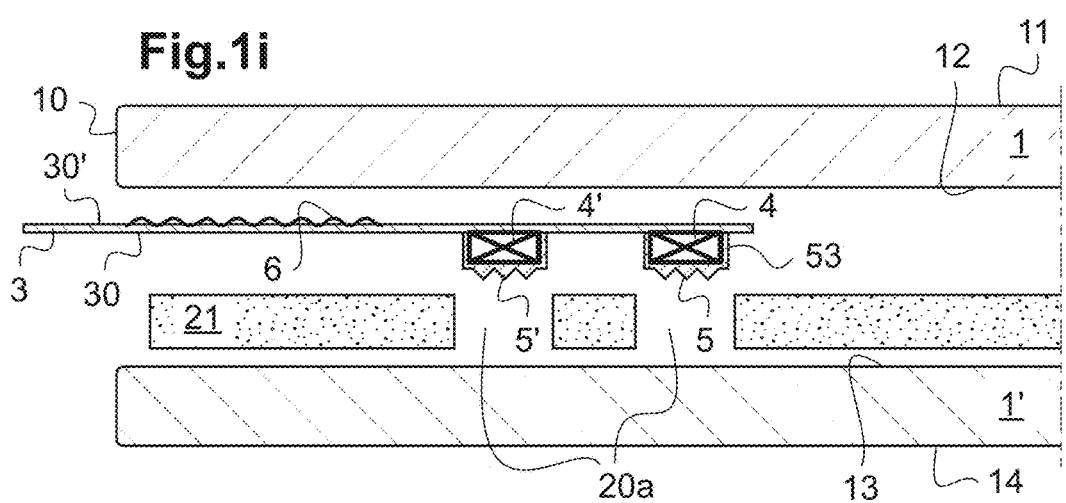

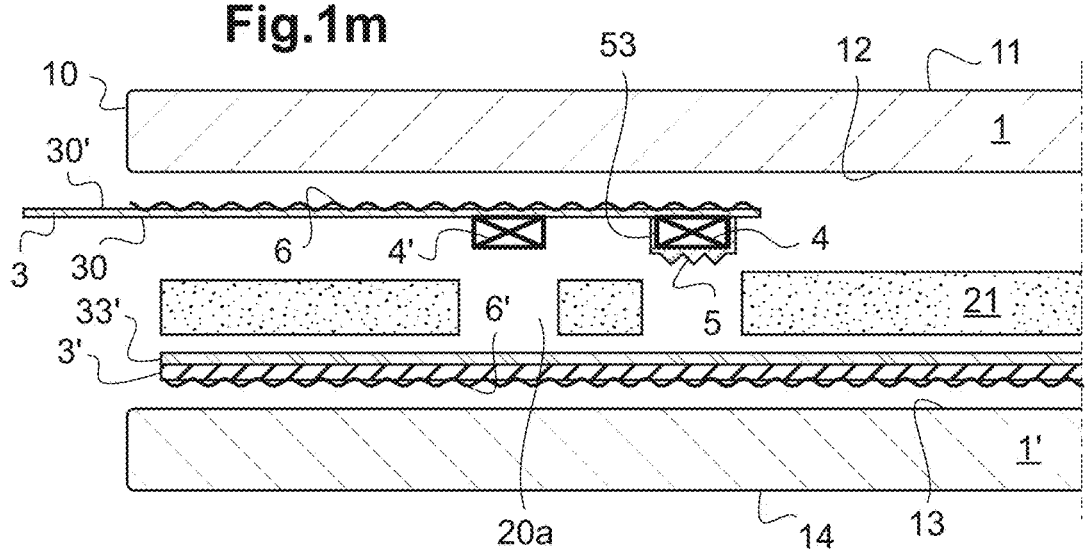
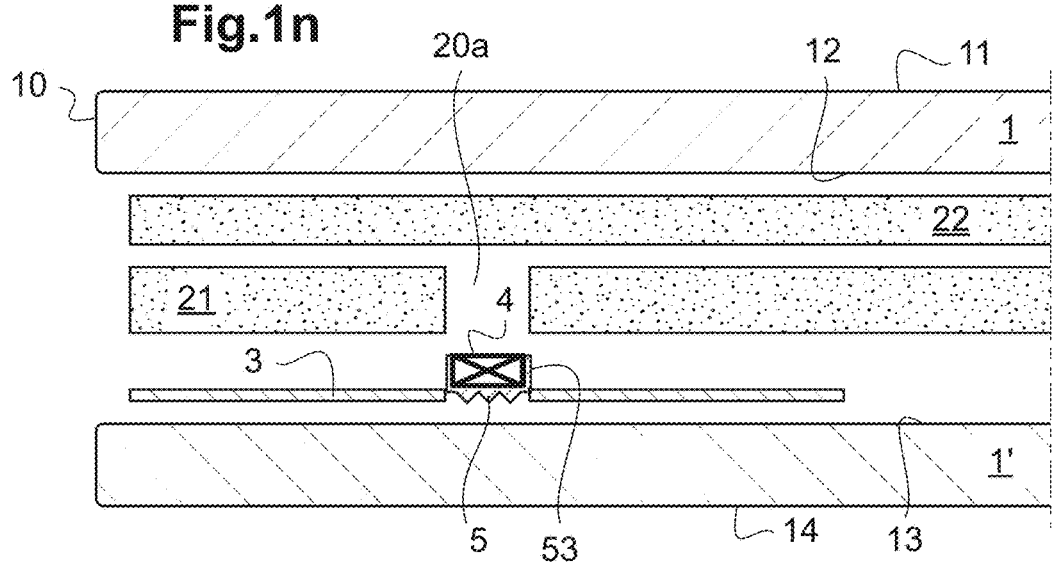
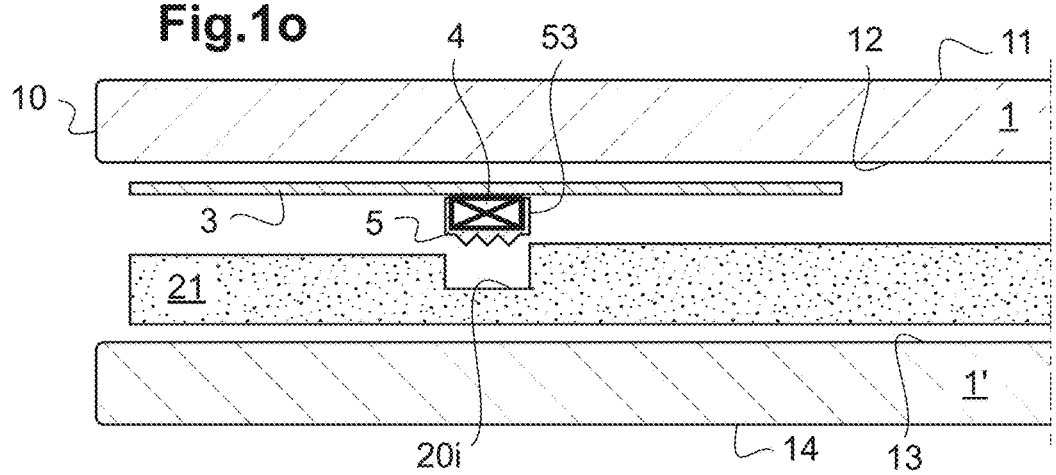

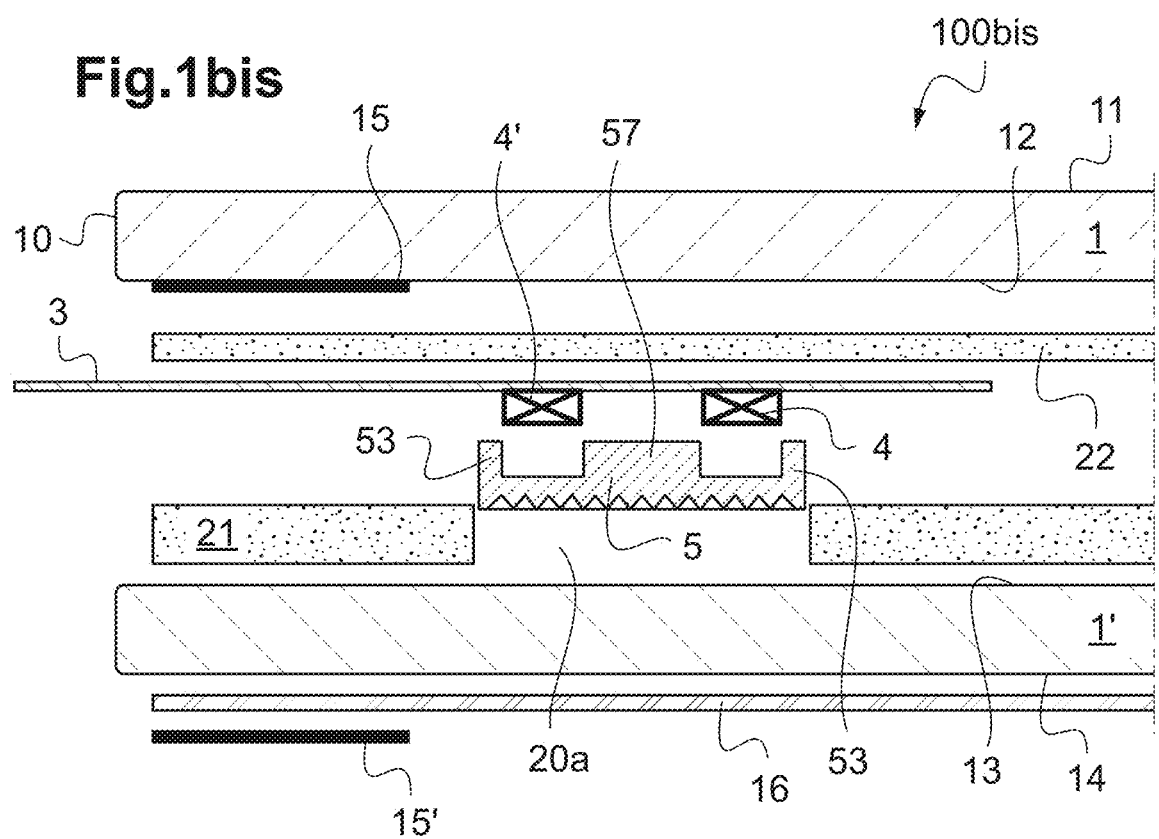
Fig.1bis
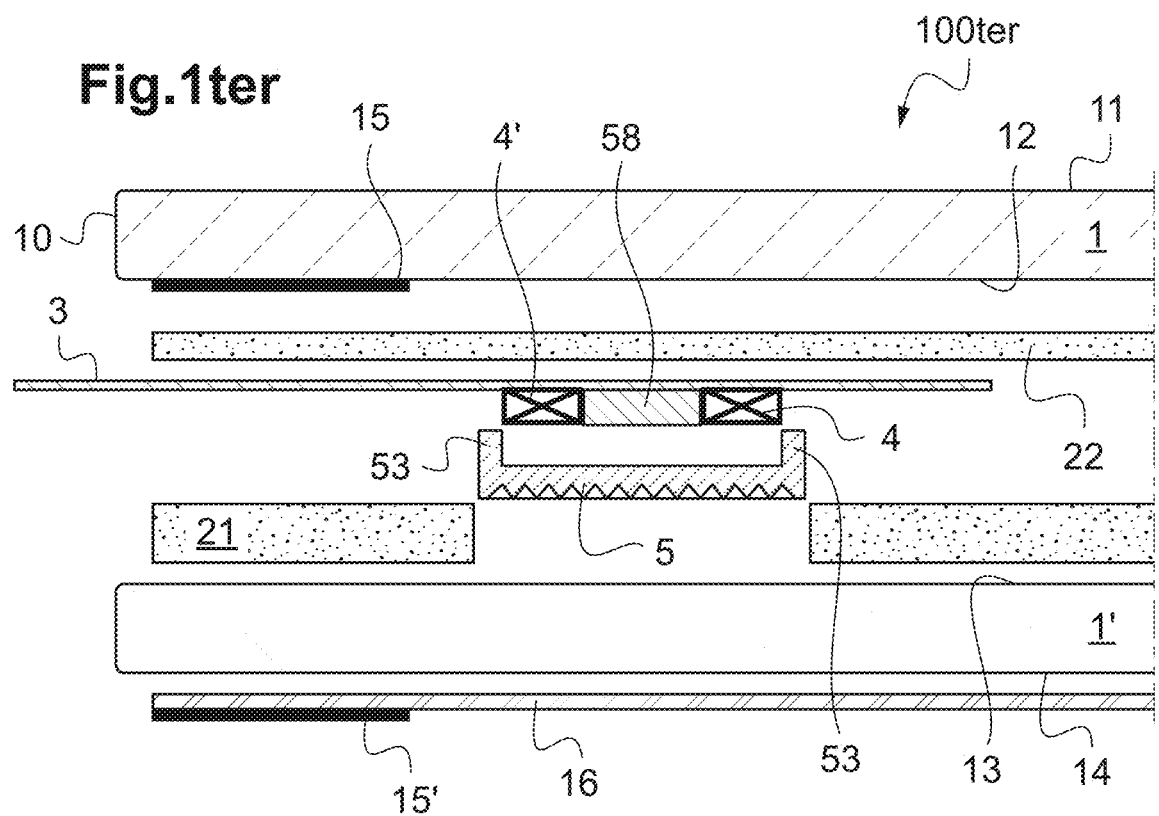
Fig.1ter

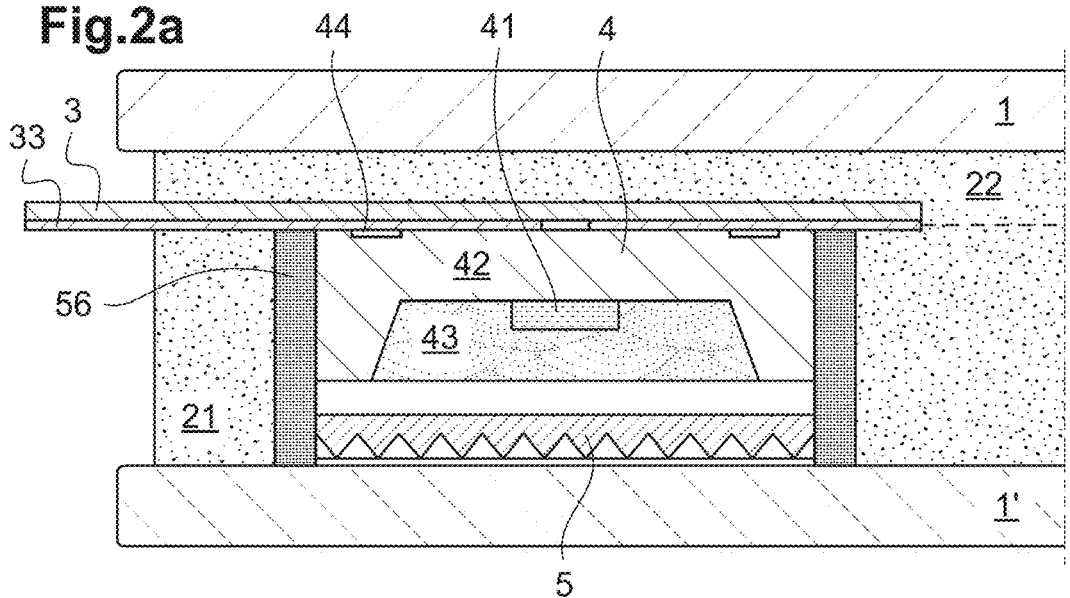
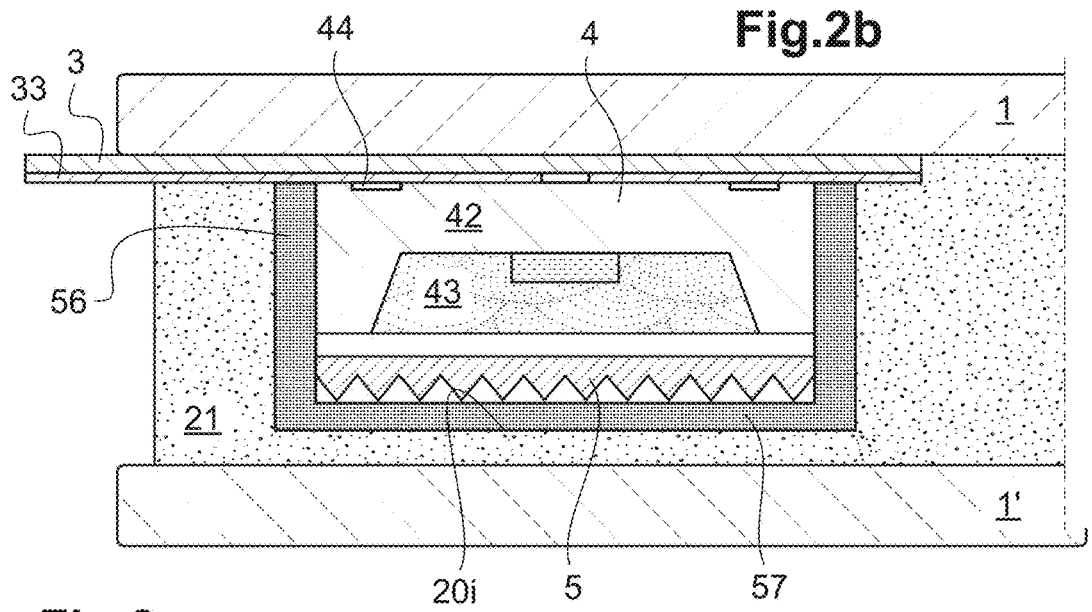
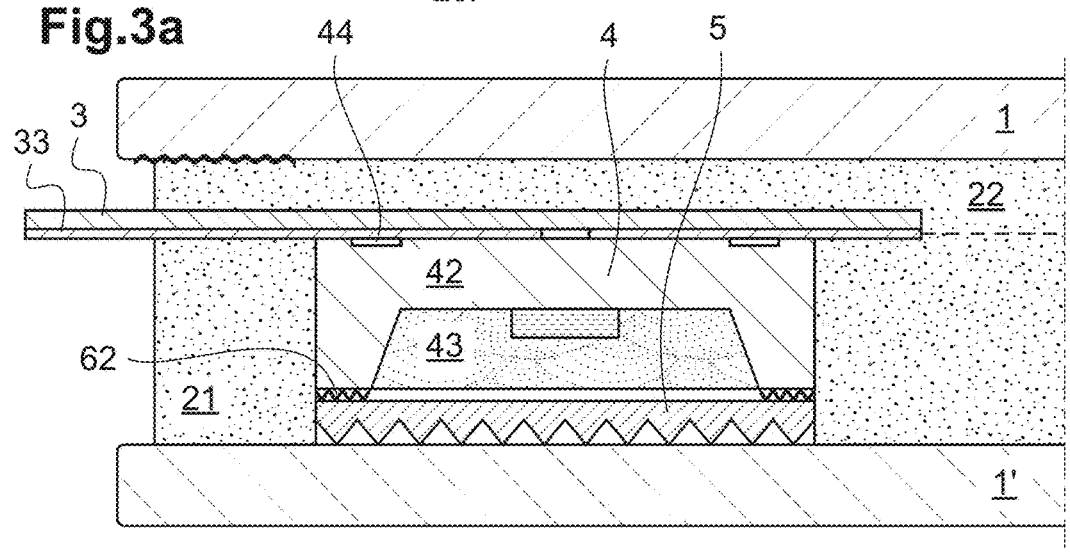

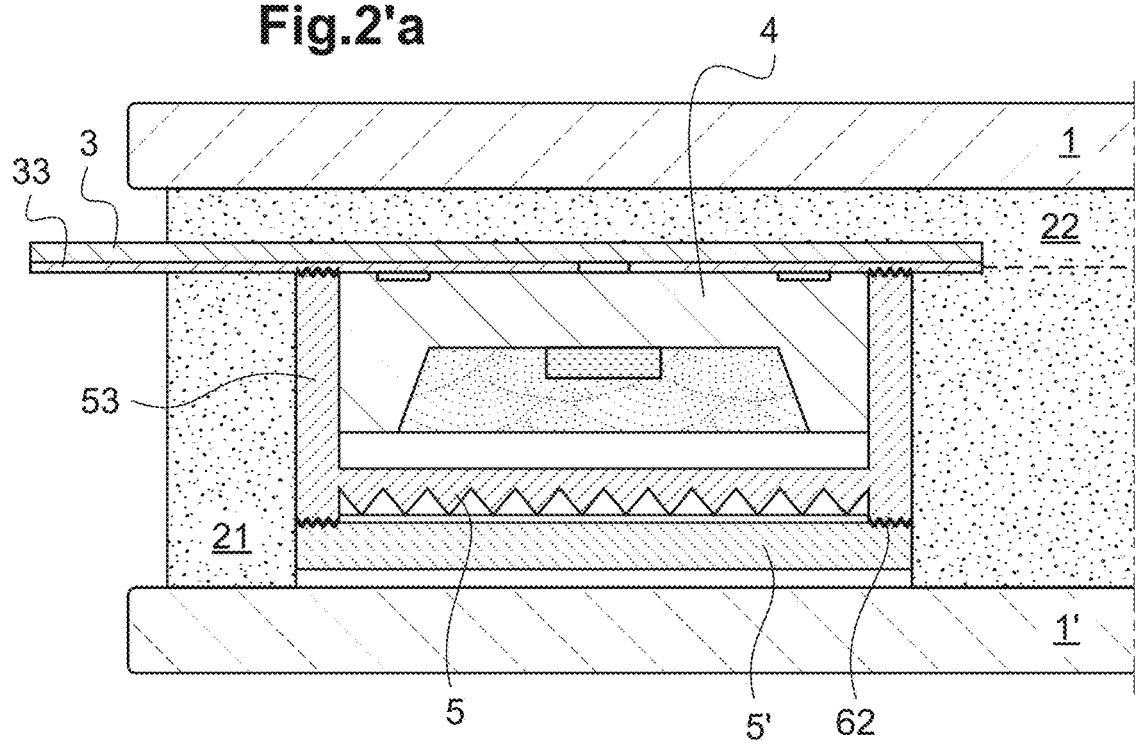
Fig.2'a
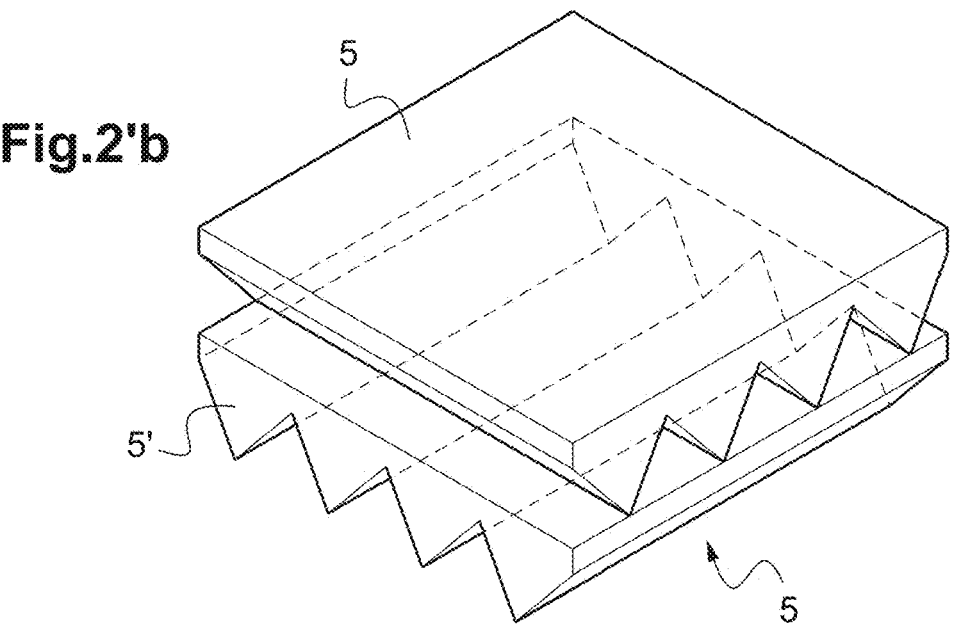
Fig.2'b
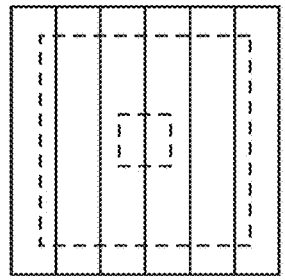
Fig.2'c

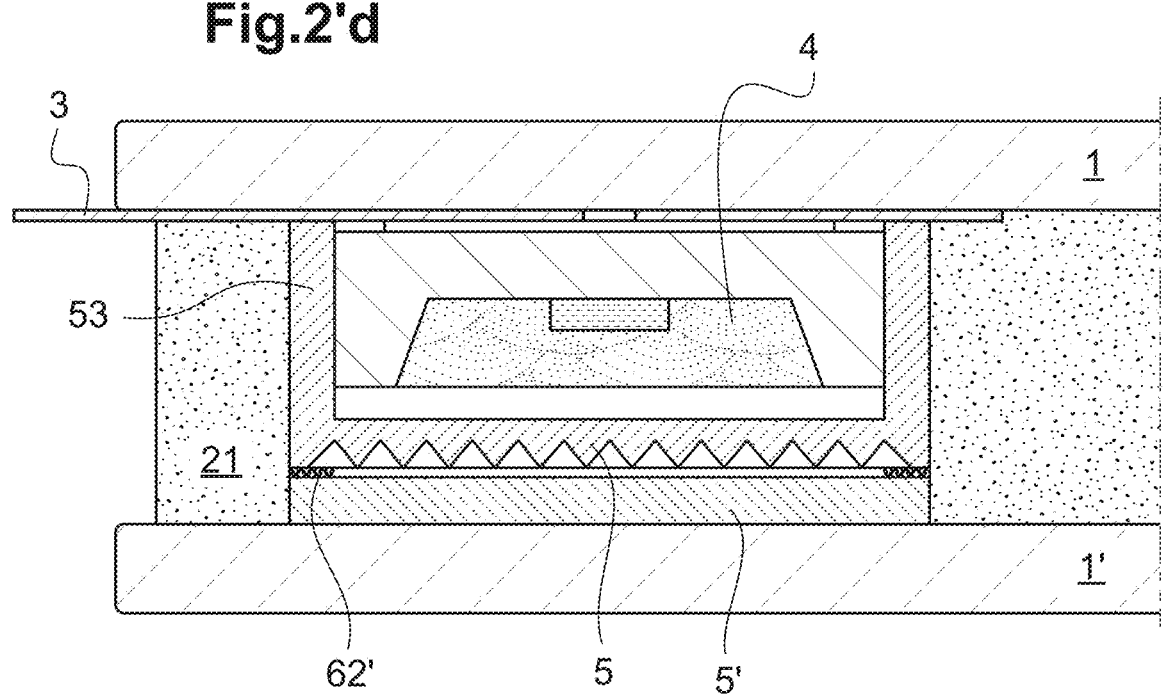
Fig.2'd
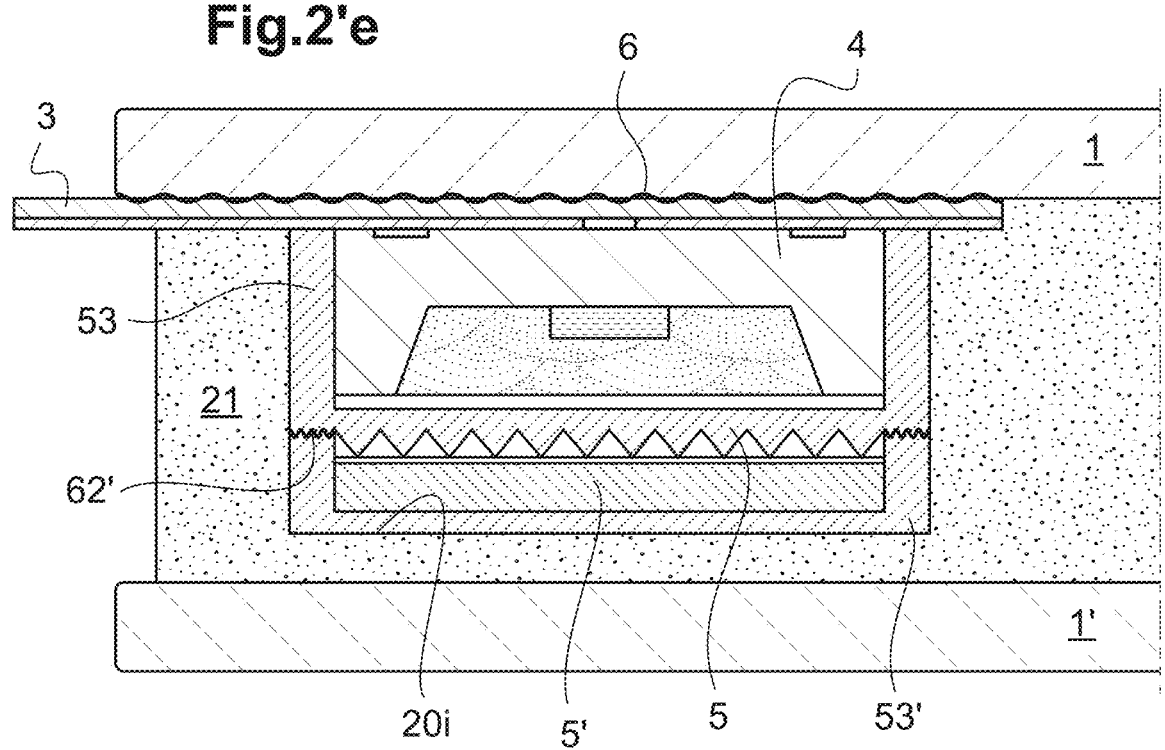
Fig.2'e

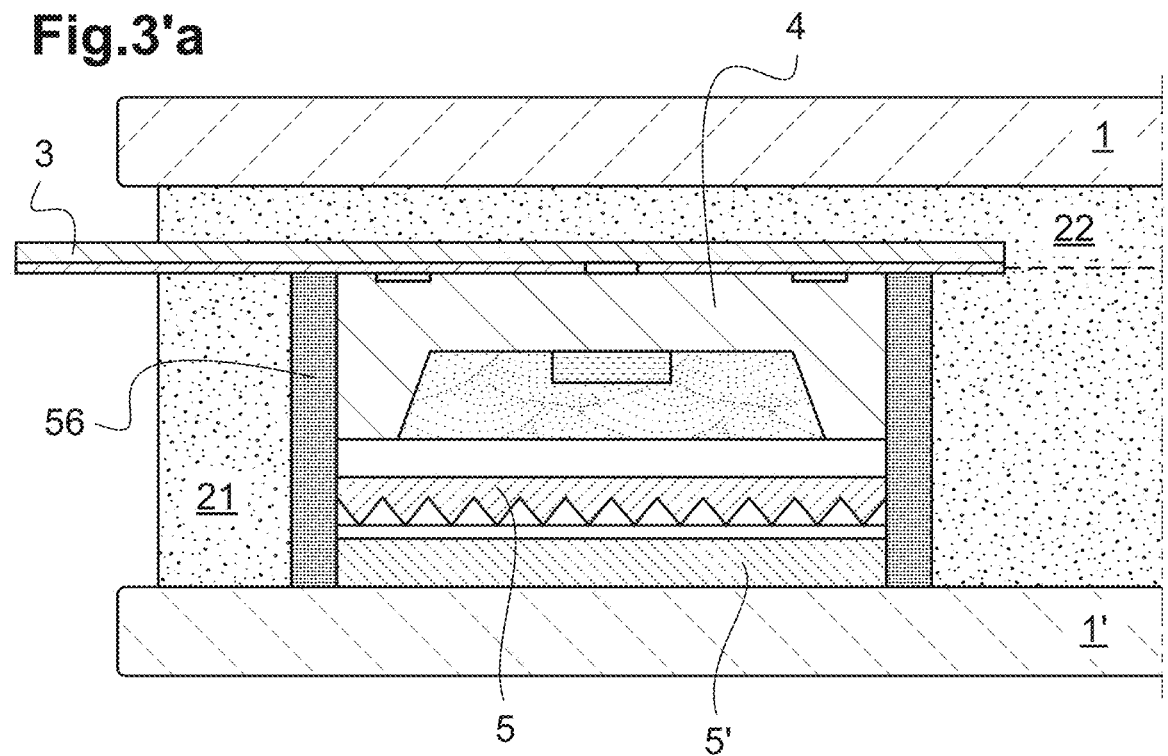
Fig.3'a
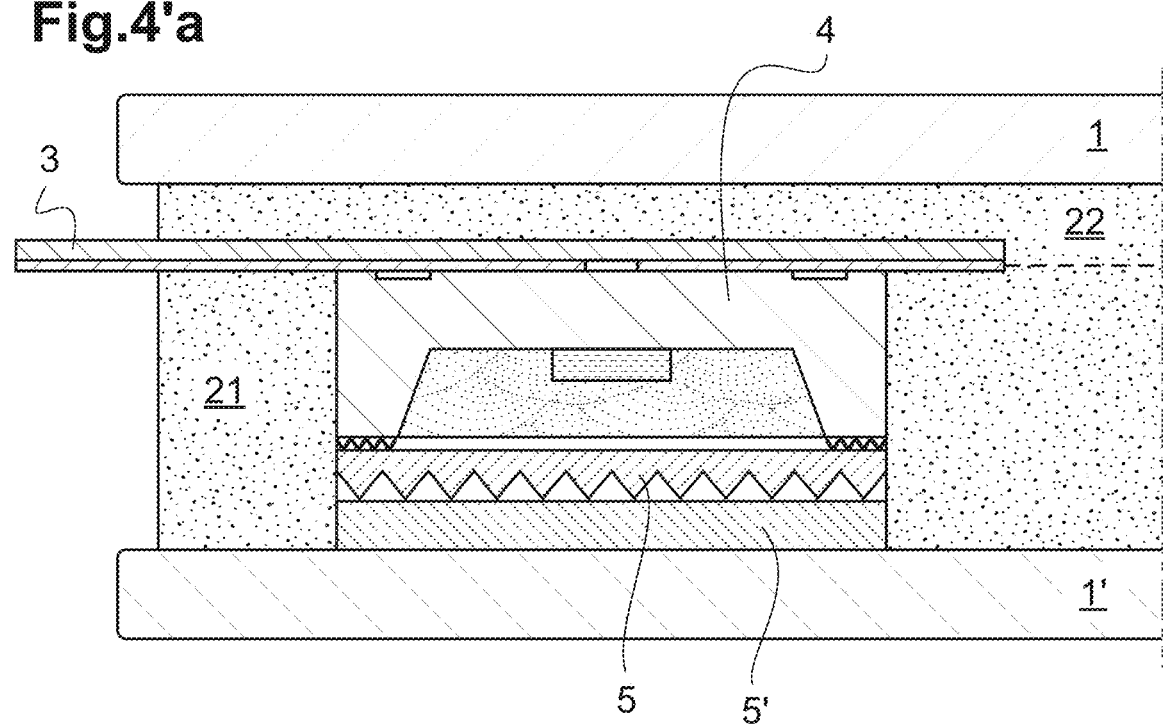
Fig.4'a

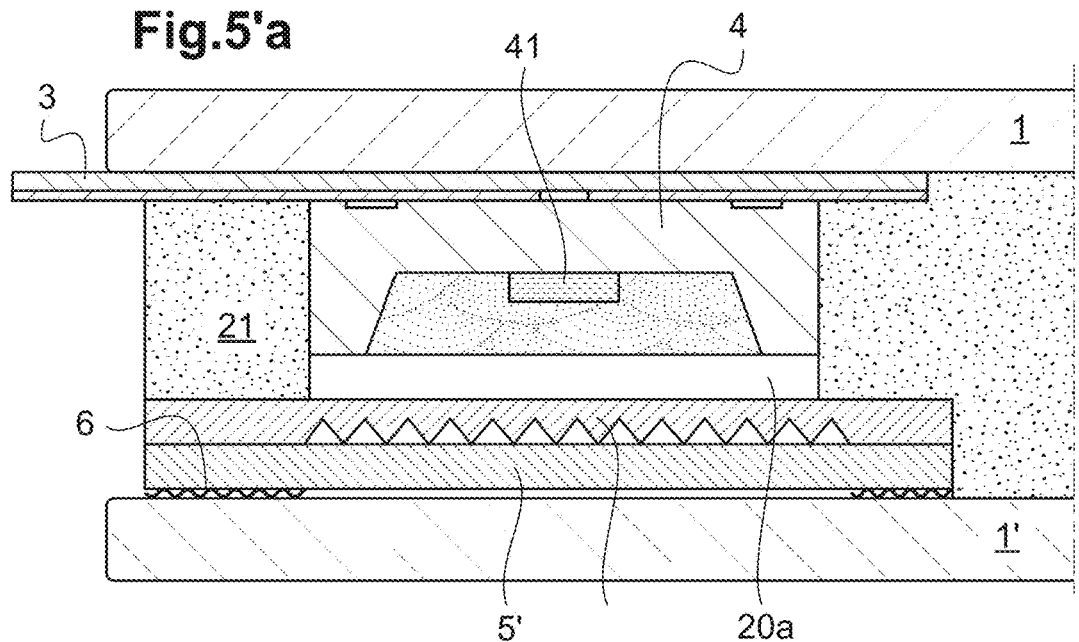
Fig.5'a
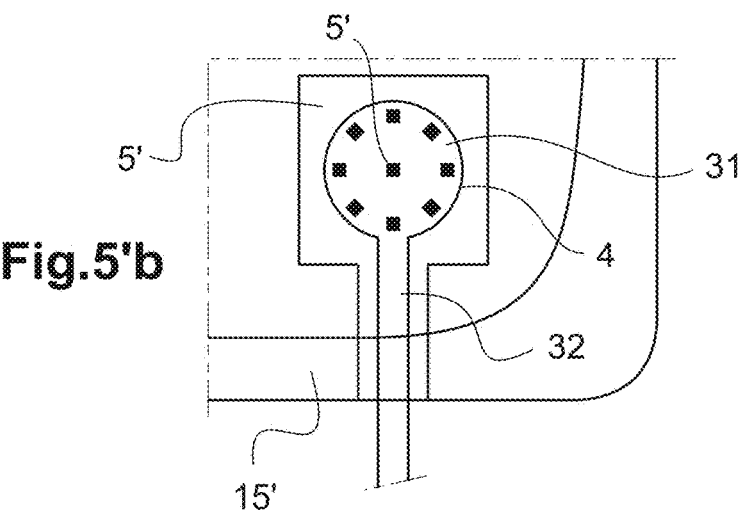
Fig.5'b
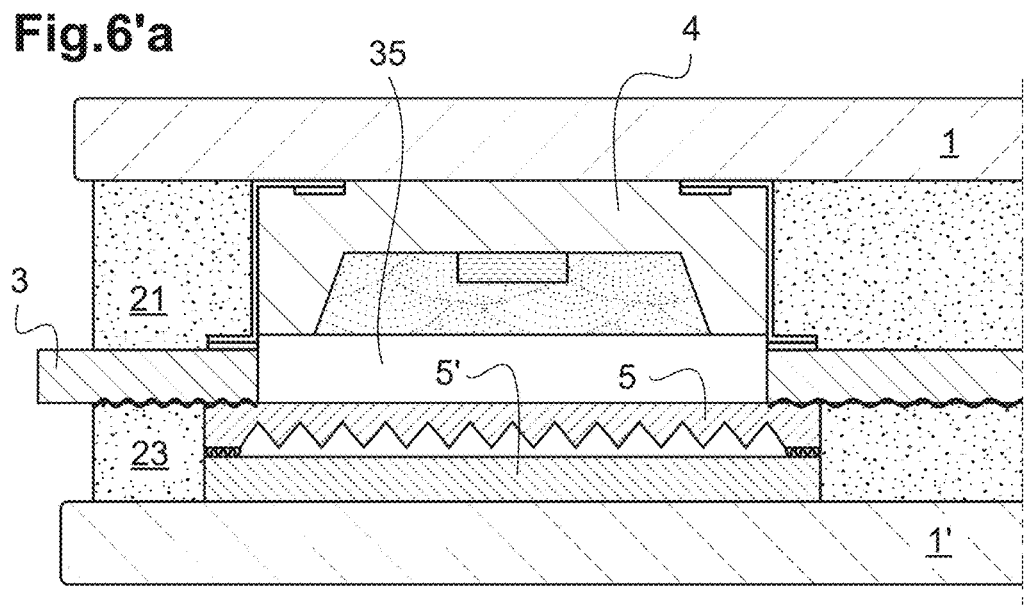
Fig.6'a

Fig.7'a
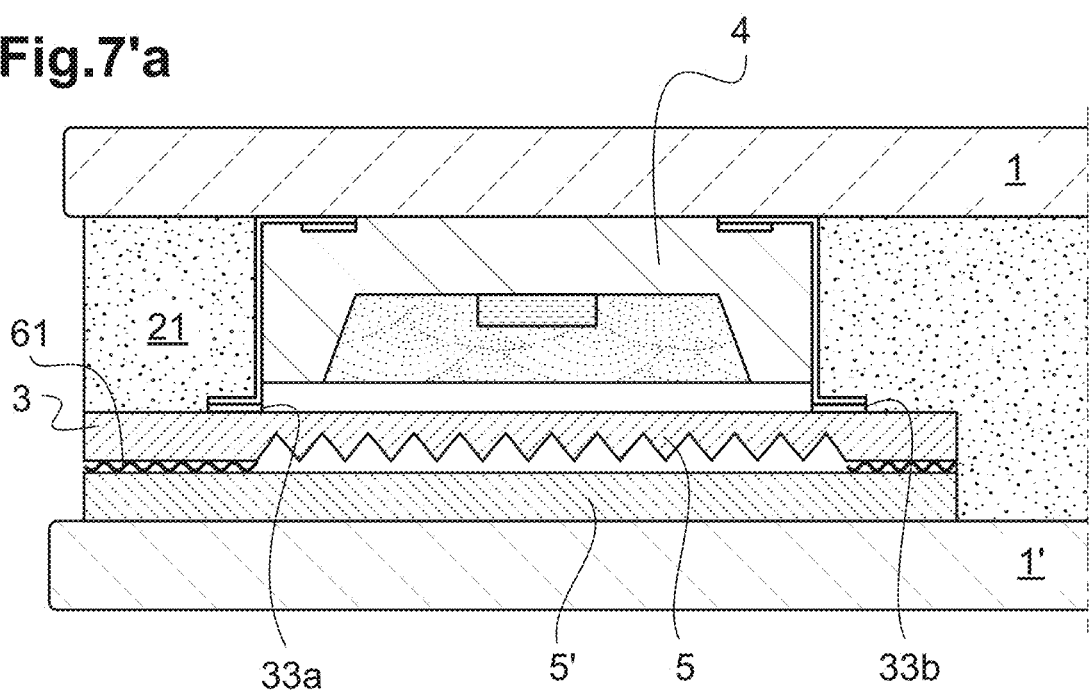
Fig.2'bis
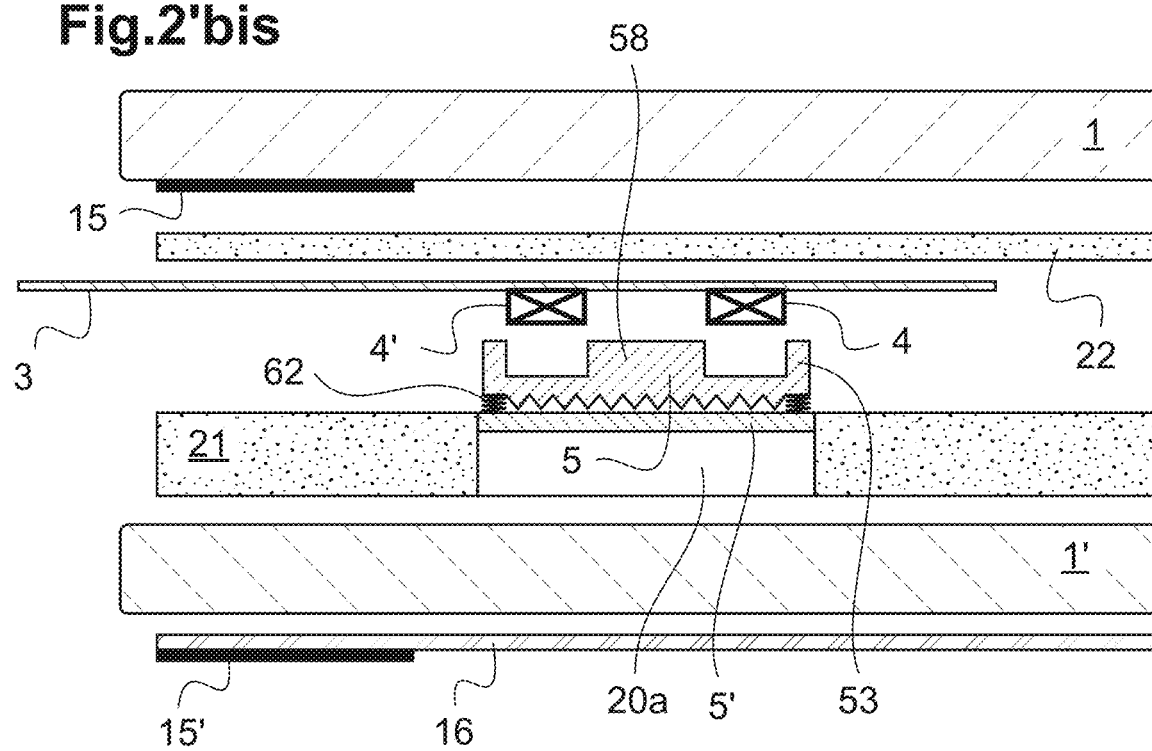

VEHICULAR LUMINOUS LAMINATED GLAZED ROOF, VEHICLE INCORPORATING SAME AND MANUFACTURE

CROSS-REFERENCE TO RELATED APPLICATIONS

This application is the U.S. National Stage of PCT/FR2017/051294, filed May 24, 2017, which in turn claims priority to French patent application number 1600852 filed May 26, 2016. The content of these applications are incorporated herein by reference in their entireties.

The invention relates to a vehicular luminous laminated glazed roof and to a vehicle including such a roof and to the manufacture of such a roof.

Glazed automobile roofs are becoming increasingly common and certain variants thereof are capable of providing ambient lighting. The light originates directly from light-emitting diodes integrated into the laminated glazing.

More precisely, document WO2013189794, in the embodiment described with reference to FIG. 1, includes a luminous glazed automobile roof comprising:

a laminated glazing including:
  a first glazing, forming an exterior glazing, with first and second main faces, often called F1 and F2;
  a lamination interlayer taking the form of three PVB sheets;
  a second glazing, forming an interior glazing, with third and fourth main faces, often called F3 and F4,
the second and third faces being the internal faces of the glazing; and
  a set of diodes on a thin carrier that is a strip of glass including an electrical-supply circuit formed from a conductive oxide layer,
  each diode having an emitting face emitting in the direction of the interior glass,
  the central sheet of the lamination interlayer having a through aperture arranged to completely encircle the glass strip for its integration.

The rejection rate of this glazing could be improved and thereby its manufacturing cost decreased. The invention relates to a glazed roof that is more robust and even more compact and/or simple to manufacture, without sacrificing optical performance.

For this purpose, the first subject of the present application is a luminous laminated glazed roof for a vehicle and in particular an automobile or even a mode of public transport, said roof comprising:

a laminated glazing including:
  a first (transparent) glazing, made of preferably curved, optionally clear, extra-clear or preferably tinted, in particular grey or green, mineral glass, intended to be the exterior glazing, with first and second main faces, called face F1 and face F2, respectively, for a motor vehicle, and preferably at most 2.5 mm, even of at most 2.2 mm—in particular 1.9 mm, 1.8 mm, 1.6 mm and 1.4 mm—or even of at most 1.3 mm or at most 1 mm in thickness;
  a second (transparent) glazing, intended to be the interior glazing, which is made of preferably curved and preferably clear or extra-clear or even tinted (less than the first glazing) mineral glass, with third and fourth main faces, face F3 and face F4, respectively, for a motor vehicle, and preferably of thickness smaller than that of the first glazing, even of at most 2 mm—in particular 1.9 mm, 1.8 mm, 1.6 mm and 1.4 mm—or even of at most 1.3 mm or less than 1.1 mm or even of less than 0.7 mm and in particular of at least 0.2 mm, the total thickness of the first and second glazings preferably being strictly smaller than 4 mm, and even than 3.7 mm, the second glazing possibly being chemically toughened;
  between faces F2 and F3, which are the internal faces of the laminated glazing, a "transparent", optionally clear, extra clear or even tinted, in particular grey or green lamination interlayer (film) (tinted above all if the apertures are through apertures) made of preferably thermoplastic polymeric material and better still made of polyvinyl butyral (PVB), said lamination interlayer film (single sheet or composite sheet) having a main face FA face F2 side and a main face FB face F3 side, the face FA possibly making adhesive contact with the face F2 (which is uncoated or coated with a coating) and the face FB possibly making adhesive contact with the face F3 (which is uncoated or coated with a coating), lamination interlayer of thickness $E_A$ between the face FA and FB—which for a motor vehicle—is preferably at most 1.8 mm, better still at most 1.2 mm and even at most 0.9 mm (and better still at least 0.3 mm and even at least 0.6 mm), said interlayer, in particular being a first acoustic and/or tinted sheet, in particular being set back from the edge face of the first glazing by at most 2 mm and set back from the edge face of the second glazing by at most 2 mm; and
  a set of $N>1$ inorganic light-emitting diodes, each diode including at least one semiconductor chip preferably in a package, each chip being (having at least one emitting face) able to emit in the direction of the face F3, and each diode in particular having an edge face and a front surface (in the plane of the front face of the package) and said diode even preferably having a width W4 (maximum dimension normal to the optical axis) of at most 10 mm and even of at most 8 mm and better still the width of the diode and optional collimating optics assembly is at most 15 mm and even at most 8 mm, each diode being of sub-millimeter-sized thickness larger than 0.2 mm—better still the thickness of the diode and collimating optics assembly is in particular larger than 0.2 mm and preferably sub-millimeter-sized.

Said lamination interlayer is provided between face FA and face FB with one or a set of M apertures that are preferably through apertures or that form blind holes, each aperture being of width $W_A$ (larger than or equal to the diode and collimating optics assembly in the aperture) of at most 20 mm and even of at most 15 mm.

Each diode is associated with one through aperture or one blind hole housing (encircling the edge face of) the diode and even housing (all or some) of a collimating optics, or at least one group of said diodes is associated with a given what is called common through aperture or a what is called common blind hole, housing the group of diodes and even housing (all or some) of an in particular common collimating optics.

In particular:
  when the aperture is a through aperture and the face FB makes contact with the face F3, the front surface of the diode is preferably set back from the face F3;
  when the aperture is a through aperture and when the diode is reverse mounted and the face FA makes contact with the face F3, the diode is preferably set back from face F2 (from face FA); and when the hole is blind, the remaining thickness, called the bottom thickness Hf, is at most 0.3 mm and/or at least 0.1 mm or 0.2 mm.

Diodes of said set of diodes, or even all the diodes, may be on the face F2, which is in particular provided with an electrically conductive (preferably transparent) layer made up of two or more zones for electrically connecting the diodes, which zones are isolated via one or more insulating strips that are in particular sub-millimeter-sized in width; it may be a question of an electrically conductive layer covering face F2 and furthermore having a function as a solar control and/or heating layer, or even of electrically conductive (local) tracks on the front face of a flexible carrier that is what is called the diode carrier, of sub-millimeter-sized thickness e'2 preferably of at most or less than 0.2 mm, between the face FA and the face F2;

and/or diodes of said set of diodes are reverse mounted on the face F3, which is in particular provided with an electrically conductive (preferably transparent) layer made up of two or more zones for electrically connecting the diodes, which zones are isolated via one or more insulating strips that are in particular sub-millimeter-sized in width; it may be a question of an electrically conductive layer covering face F3 and furthermore having a function as a solar control and/or heating layer, or even of electrically conductive (local) tracks on the back face of a flexible carrier that is what is called the diode carrier, of sub-millimeter-sized thickness e'2 and preferably of at most 0.2 mm between the face FB and the face F3.

Thus, the present invention proposes local cut-outs in the lamination interlayer, which cut-outs are dedicated to the diodes. In particular, the need to cut all the way around the diode carrier (PCB board or printed circuit board) as was the practice in the prior art, which increased the risk of a poor-quality assembly (bubbles, delaminations, aesthetic defects) is avoided. In particular, the diode carrier is quite thin in order to avoid the need to have to add a PVB sheet back face. The group of diodes in a common hole may occupy an area S of width or length of at most 20 mm.

The lamination interlayer is preferably closest the diodes and preferably, taking into account the tolerance in the position of the diodes during the cutting, the cut-out is preferably chosen to be larger than the width of the diodes (even if the interlayer is malleable).

The glazed roof furthermore includes a set of collimating optics, each collimating optics being associated with one light-emitting diode, called a dedicated light-emitting diode, in the preferably through aperture or with a group of light-emitting diodes that are in the common, preferably through, aperture.

Each collimating optics (made of transparent material) is arranged between the faces F2 and F3, with at least one functional portion between the front surface of the diode and the face F3.

The collimating optics allows lighting to be increased and/or the lighting per reading zone to be better managed, between front or back passengers.

The preferably through aperture of the lamination interlayer facilitates its installation, its integration and improves its performance.

Completely unexpectedly, in the case of a through aperture the interlayer does not flow enough to adversely affect the operation of the collimating optics.

The one or more collimating optics have an exit face for the light emitted by the diodes. The one or more collimating optics are transparent (are not reflective), and are passed through by the light emitted by the diodes.

Preferably:
the half angle of the emission of the diodes (measured exiting the front surface) is preferably at least 50°;
the angle of view, at the exit of each collimating optics, is at most 40(°).

Preferably, at least one or each collimating optics (with a textured plate) includes:
a) an array of two-dimensional motifs, exit face side, in particular including a base and a tip- or ridge-type apex, said apex optionally being truncated and said base having a length to width aspect ratio of at most 10 even of at most 5 and even of at most 2;

or b) a prismatic assembly including a first prismatic array, all of the motifs of the first array being prisms face F3 side extending longitudinally in a direction parallel to or making an angle of at most 10° or even of at most 5° and even of at most 2° to the longitudinal edge face of the roof (to the axis of the automobile), and a second prismatic array crossed with the first prismatic array, all of the motifs of the second array being prisms face F3 side extending longitudinally in a direction perpendicular to the longitudinal axis of the first prismatic array or making an angle of at most 90±10° or even of at most 90±5° and even of 90±2°. Preferably, at least one or each collimating optics according to a) includes a planar functional plate that is partially textured in its thickness, called the textured plate, which includes an entrance face oriented toward face F2 facing the diode in the preferably through aperture or the group of diodes in the common, preferably through, aperture, and an exit face oriented toward face F3, the texture forming motifs of submillimeter height (smaller than EA preferably).

Preferably, at least one or each collimating optics according to b) includes:
a first planar functional plate that is partially textured in its thickness, called the first textured plate, which includes an entrance face oriented toward face F2, facing the diode in the preferably through aperture or the group of diodes in the common, preferably through, aperture and a textured exit face oriented toward the face F3, the texture forming said motifs (of the first prismatic array) of submillimeter height (smaller than EA preferably);
a second planar functional plate that is partially textured in its thickness, called the second textured plate, which includes an entrance face oriented toward the exit face of the first plate, toward face F2, facing the diode in the preferably through aperture or the group of diodes in the common, preferably through, aperture, and an exit face oriented toward face F3, which is textured, the texture forming said motifs (of the second prismatic array) of submillimeter height (smaller than EA preferably). The (first and even second) textured plate is of width larger than or equal to the width of the front surface of the diode (useful zone) in the preferably through aperture or of the group of diodes in the common, preferably through, aperture.

The entrance face (of the first plate) is preferably spaced apart from the front face of the diode in the preferably through aperture or of the group of diodes in the common, preferably through, aperture.

Preferably, together the height of the diode/entrance and exit air gap/first and second textured plate is at most 1 mm and even 0.9 mm.

The (first and even second) textured planar plate advantageously includes a plurality of geometric motifs formed from curved or planar surfaces. It is preferably a question of repetitive geometric motifs, i.e. geometric motifs having substantially the same shape and placed at substantially equal distance from one another.

Of course, the shape of the zone covered by the (first and even second) textured planar plate is independent of the shape of the motifs.

The height of the (first and even second) textured plate is comprised between 5 µm and 1 mm, preferably between 10 µm and 500 µm, in particular between 20 and 300 µm, and is preferably at least 50 µm and at most 200 µm.

The (first and even second) textured plate has a low roughness so as to prevent any scattering. Independently of the roughness, it is possible to define a texture depth or height that is equal to the distance between the highest point and the lowest point of a motif.

The dimensions of the motifs are about 10 µm to 500 µm and better still between 100 and 300 µm and preferably at least 50 µm in size.

The (first and even second) textured plate is partially textured in its thickness, in other words it has a constant thickness between the smooth face and the closest point of the textured face. Preferably, the remaining (constant) thickness of the plate is defined as the distance between the lowest point between the textured face (entrance face if array of prisms) and the opposite face (entrance face if array of prisms). The remaining thickness is at least 50 µm and even at most 200 µm.

The (first and even second) textured plate (and even a part bearing it) may be made of a thermoplastic polymer such as a polyurethane or a polycarbonate (PC) or a polymethyl methacrylate (PMMA). It may be a question of a molded part made of PMMA or PC. The texture may be produced by rolling (i.e. cast), thermoforming, etching and in particular laser etching for a polymer material. Depending on the shape of the desired texture, this process may not necessarily lead to perfect geometric shapes: rounded ridge or apex.

Preferably, the motifs are as close as possible to one another and for example their bases are separated by less than 1 mm and preferably by less than 0.5 mm.

More preferably, the motifs are contiguous or essentially contiguous. Motifs are said to be contiguous when they touch each other in at least one portion of their surface. It is preferred that the motifs be contiguous because thus the surface of the (first and even second) plate is more textured. Certain motifs do not allow complete contiguousness between the motifs. This is in particular the case when, if the bases are circles that even touch, there remains a certain area between the circles not belonging to the motifs. By complete contiguousness, what is meant is the fact that the outline of the base of a motif also in its entirety forms part of the outlines of the neighboring motifs thereof.

Certain motifs may be completely contiguous, so that the entirety of the surface of the plate forms part of at least one motif. It is a question of a tessellation. In particular, motifs with square or rectangular or hexagonal bases may be completely contiguous if their bases are identical. In the case of square or rectangular bases, said bases should also be aligned if the motifs are to be completely contiguous. In the case of hexagonal bases, it is advisable for said bases to form a honeycomb.

Advantageously, at least one or each collimating optics is a part that is preferably monolithic (for a)) or that is made up of a plurality of united pieces (two for example, in particular two textured plates) in the preferably through aperture, and that is mounted on the diode carrier in the optionally common preferably through aperture or mounted on the diode or the group of diodes, said part including:

the functional portion of the collimating optics, in particular a (first) textured plate and an optional second textured plate (for b));

a peripheral extension (a rim), in particular of the (first) textured plate, in the direction of the face F2 along the edge face (of the package) of the diode or of at least one of the diodes of the group of diodes, in particular of width W of at most 1.5 mm, of at least 0.1 mm and better still of at least 0.5 mm, and even making contact with said edge face and better still spaced apart by at most 2 mm or making contact with the lamination interlayer (with the wall forming the preferably through aperture).

The peripheral extension—outside of the functional textured zone—may have textured or smooth faces.

The peripheral extension may have a face facing the face F3 that protrudes from the textured exit face (in order to leave an exit gap, for example a thickness allowance).

The peripheral extension may have a face facing the face F3 that is in the plane of the highest point of the textured exit face. The textured exit face and/or the peripheral extension making contact with or preferably being set back from the face F3, in particular if the motifs are raised.

The peripheral extension and/or the (first) textured plate and even the second textured plate (for b)) may be entirely housed in the optionally common and preferably through aperture. The peripheral extension and/or the textured plate do not protrude from the face FB.

The peripheral extension may take the form of at least one attaching foot (part of L-shaped cross section) and preferably of at least two attaching feet (the part is of U-shaped cross section):

attachment of the collimating optics to the diode, the one or more attaching feet being on either side of the edge face of the diode and spaced apart from or on the diode carrier, attachment by press fitting or by adhesive bonding preferably beyond the front surface of the diode or the group of diodes (in order to retain an entrance air gap);

attachment of the collimating optics to each diode or group of diodes, the one or more attaching feet being on either side of the edge face of the diode and spaced apart from or making contact with the diode carrier, attachment by press fitting or by adhesive bonding preferably beyond the front surface of the diode or the group of diodes (in order to retain an entrance air gap);

attachment of the collimating optics to the diode carrier.

The peripheral extension preferably forms a surround of the diode in the preferably through aperture or of the group of diodes in the common, preferably through, aperture. The part is of U-shaped cross section.

The surround preferably comprises a housing for accommodating the diode or group of diodes and in particular the wall of the surround includes stubs for holding the diode or the group of diodes, the stubs preferably being regularly distributed, and preferably at least two in number.

The height of the extension (surround) is preferably at a distance of at the most 0.3 mm, or even preferably at most 0.1 mm from the face FB.

In one alternative embodiment to on-diode mounting or mounting on a diode carrier, the collimating optics according to a) may be a textured transparent film between the face F3 and the lamination interlayer with the one or more preferably through apertures. The collimating optics (according to a) is then common to all the diodes.

Regions of each textured transparent film covering a zone with a set of diodes may be textured, and therefore each textured transparent film may contain one or more textured regions each facing one diode or the group of diodes, adjacent regions being smooth (in order to preserve transparency).

The textured transparent film may be a film made of plastic (organic polymer), and preferably of polyethylene terephthalate, polycarbonate, polymethyl methacrylate or polystyrene.

The collimating optics according to b) may be a first textured transparent film and a second (crossed) textured transparent film between the face F3 and the lamination interlayer with the one or more preferably through apertures. The collimating optics is then common to all the diodes. Regions of the textured transparent film covering the zone with the set of diodes may be textured, and therefore the textured transparent film may contain one or more textured regions each facing one diode or groups of diodes, adjacent regions being smooth (in order to preserve transparency).

However, a solution with a set of collimating optics mounted in preferably through apertures is preferred.

Preferably:
  the diodes with their collimating optics (a) or b)) are in blind or (preferably) through apertures of a PVB sheet or in blind or through apertures of a PVB sheet/functional film with an optional functional coating/PVB sheet;
  or the blind or (preferably) through aperture is common to the diodes of the group of diodes and a portion of the collimating optics (a) or b), in particular a first textured plate or film) forms a spacer between the diodes or a spacer between the diodes is a part separate from the collimating optics (a) or b), in particular on the first textured film or plate).

The diodes of the group of diodes are for example spaced apart by at most 0.5 mm or the interdiode space includes a transparent spacer.

The width (diameter or length for example (maximum dimension)) of the diode (defined by the optional package) is at most 15 mm and even at most 10 mm.

The base of the motifs is preferably parallel to the emitting face.

The truncated height of the motifs is at most 10% of the value of the pitch of the texture. The motifs (of the first plate and/or of the textured second plate) may be:
  convex, i.e. extend outward with respect to the general plane of the textured face of the plate; or
  concave, i.e. be recessed into the bulk of the plate.

The two-dimensional motifs are preferably axisymmetric or pyramidal cones having nonzero half angles at the apex, the two-dimensional motifs or prisms having a half angle at the apex that ranges from 35 to 55°, 40 to 50° and better still of 45°.

The base of the two-dimensional motifs is for example polygonal, square or rectangular or hexagonal, triangular, even round: circular, etc.

The smallest circle able to contain the base of the motifs may be inscribed in a circle of diameter of at most 2 times the height of the motif.

A motif may be:
  raised and therefore solid; or
  recessed (in other words inverted), the walls of a cavity forming the one or more surfaces the apex (the ridge) of which is oriented toward the face F2 and the top surface of the cavity defining the outline of the base.

Furthermore, the two-dimensional motif may be:
  raised and therefore solid, for example with a conical surface, and in particular with lateral faces separated by ridges; or
  recessed (in other words inverted), the walls of a cavity forming the one or more conical surfaces the apex of which is oriented toward the face F2 and the top surface of the cavity defining the outline of the base.

Preferably, the two-dimensional motif has the planar (lateral) faces of a pyramid. A conventional cone does not have a planar surface. The two-dimensional motifs for example end in a tip, such as is the case for a cone or a pyramid, i.e. the point of the motif furthest from the general plane of the plate is the apex of a tip. If the two-dimensional motif is a regular pyramid, the base (comprised in the general plane of the textured face of the plate) is an equilateral triangle.

A diode may be of the chip-on-board type or even most preferably a surface mount device (SMD) then including a peripheral package.

In one preferred embodiment, each, preferably power, diode is an electronic component including at least one semi-conductor chip and is equipped with an in particular polymeric or ceramic peripheral package encapsulating the edge face of the electronic component (and defining the edge face of the diode), said package (protruding from and) surrounding the semiconductor chip.

The package may correspond to the maximum thickness (height) e2 of the diode. The package is for example made of epoxy. A polymeric package may optionally be compressed (the final thickness after lamination may be smaller than the initial thickness) during the lamination. The (polymeric) package may be opaque.

The package (which is monolithic, or made of two parts) may comprise a portion forming a support bearing the chip and a portion forming a reflector that flares with distance from the support above the chip, and containing a protective resin and/or a material having a color conversion function. The front surface may be defined as the surface of this material covering the chip, this surface being set back or level with the "front" surface of the reflector.

Preferably, the one or more diodes are components that are surface mounted on the front face of the diode carrier and the one or more diodes may even have a Lambertian or quasi-Lambertian emission motif.

In one preferred embodiment, the thickness, preferably of PVB, between face FA and face FB, which ranges from 0.7 to 0.9 mm (a single sheet or a first and second sheet), is made of PVB, the diodes are surface mount devices on the front face of the diode carrier, and e'2 is at most 0.2 mm and better still at most 0.15 mm and even at most 0.05 mm.

The width of the diode carrier, which may be a printed circuit board (PCB), is preferably at most 5 cm, better still at most 2 cm, and even at most 1 cm. The width (or length) of a diode with a single semiconductor chip, such diodes generally being square in shape, is preferably at most 5 mm. The length of a diode with a plurality of semiconductor chips (typically surrounded by the package), such diodes generally being rectangular in shape, is preferably at most 20 mm and better still at most 10 mm.

In particular in the case of a single sheet with the through apertures—in particular an optionally acoustic tinted or clear PVB sheet—the diode carrier (which is sufficiently malleable to adapt to the shape of the curved laminated glazing) may be adhesively bonded to or pressed against face F2 or face F3 in a reverse-mount configuration, e'2 is at most 0.15 mm and even at most 0.1 mm and the adhesive bonding may in particular be achieved with an adhesive (glue or preferably a double-sided adhesive) of thickness e3, where e3≤1.1 mm, better still e3≤0.05 mm and is even such that e3+e'2 is at most 0.15 mm and better still at most 0.1 mm.

With this adhesive, preferably e3+et2≤e1 (above all if present on the back face of the PCB in the zone of the diodes).

The entire length of the carrier or discrete points, in the diode zone and/or outside the diode zone, is/are adhesively bonded. The peripheral adhesive may form a seal to liquid water.

The diode carrier may be local and optionally with through apertures in order to make it more inconspicuous.

The roof may comprise a sheet, in particular the lamination interlayer, made of thermoplastic material, between the back face of the diode carrier and face F2 or face F3 in reverse-mount configuration.

The lamination interlayer, formed from one or more films—between the face FA and FB and/or a sheet on the back face and/or even a sheet between the face FB and the face F3—may be made of polyvinyl butyral (PVB), of polyurethane (PU), of ethylene vinyl acetate copolymer (EVA), and for example have a thickness of between 0.2 mm and 1.1 mm.

It is possible to choose a conventional PVB such as RC41 from Solutia or Eastman.

Thus, the lamination interlayer, between face FA and face FB and/or a sheet on the back face and/or even a sheet between face FB and face F3—may comprise at least one what is called central layer made of a viscoelastic plastic having vibro-acoustic damping properties and in particular based on polyvinyl butyral (PVB) and plasticizer, the interlayer furthermore comprising two external layers made of standard PVB, the central layer being between the two external layers. By way of an example of an acoustic sheet, mention may be made of patent EP0844075. Mention may be made of the acoustic PVBs described in the patent applications WO2012/025685, WO2013/175101, in particular tinted as in WO2015079159.

Preferably, the roof has at least one of the following features:
the (individual or common) preferably through aperture is in a thickness of PVB (or in one or more PVB sheets, the interface(s) of which are in particular discernible);
the (individual or common) preferably through aperture is in an in particular three-layer or four-layer acoustic lamination interlayer;
the (individual or common) preferably through aperture is in a tinted lamination interlayer (in particular masking a little the diode carrier);
the (individual or common) aperture is in a composite (multisheet) material: PVB sheet/transparent plastic film or even PVB sheet/transparent plastic film/PVB sheet, said plastic film, in particular a PET film of sub-millimeter-sized thickness and even of at most 0.2 mm or at most 0.1 mm thickness bearing a functional coating: providing a low emissivity or solar control function and/or even a heating function;
the spacing between (individual) through apertures is at least 0.1 mm or better still at least 0.2 mm and preferably at most 50 cm for a reading light function;
the spacing between diodes of distinct (individual) through apertures is at least 0.1 mm or better still of at least 0.2 mm; and
the spacing between diodes in a through or common aperture is at least 0.1 mm or better still at least 0.2 mm and at most 1 mm.

Naturally, the face FB or another PVB sheet may make direct contact with the face F3 (face F2, respectively) or with a conventional functional coating on this face, in particular a stack of thin layers (including one or more silver layers) such as: a heating layer, antennae, a solar-control layer or low-emissivity layer, or an (opaque) decorative or masking layer such as a layer of, generally black, enamel.

The glass, preferably the internal glass, which in particular is thin and of thickness smaller than 1.1 mm, is preferably chemically tempered. It is preferably clear. Mention may be made of the examples of patent applications WO2015/031594 and WO2015066201.

The diodes are preferably power diodes that in operation are under supplied electrically with current, preferably by a factor of at least 10 and even of at least 20 (therefore intensity/10 or even intensity/20) in particular so as to maintain a temperature below the reflow temperature of the polymeric material of the lamination interlayer, and in particular a temperature of at most 130°, better still of at most 120° C. and even of at most 100° C.

These diodes guarantee an excellent efficiency and do not generate too much heat.

For example for diodes with a current rating of 1 A, a current of between 50 and 100 mA is chosen.

The inorganic diodes are for example based on gallium phosphide, gallium nitride and/or aluminum gallium nitride.

The diode carrier (PCB board) may be sufficiently malleable (flexible) to adapt to the curvature of the curved laminated glazing.

In one embodiment, the diode carrier includes a film made of a preferably transparent plastic material, preferably of polyethylene terephthalate or PET or of polyimide, provided with preferably transparent conductive tracks that are in particular metal (copper etc.) or made of transparent conductive oxide, and equipped with surface mount diodes. The conductive tracks are printed or deposited by any other deposition method, physical vapor deposition for example The conductive tracks may also be wires. Preferably, the conductive tracks and the film are transparent when they are visible i.e. when they are not masked by a masking element (layer) (such as an enamel or even a paint etc.), in particular on face F4 or F3. The conductive tracks may be transparent either because they are made of a transparent material or because they are thin enough to be (almost) invisible.

Polyimide films have a higher temperature withstand than alternative PET or even PEN (polyethylene naphthalate) films.

The diode carrier may be local and for example occupy at most 20% or at most 10% of the area of the laminated glazing or essentially cover faces F2 and F3 and preferably bears a low-emissivity or solar-control and/or even heating functional coating.

Preferably, the diode carrier, alone or associated with a flat connector, extends at least as far as to the edge face of the laminated glazing and preferably extends beyond the edge face, the diode carrier for example comprising a first portion with the one or more diodes and a narrower portion that extends beyond the glazing; and, between the back face of the diode carrier and face F2, is housed an adhesive that is impermeable to liquid water, of thickness of at most 0.1 mm and better still at most 0.05 mm, in particular a double-sided adhesive. Such an adhesive is preferred to an over-molding solution. It may be a question of the preferably transparent adhesive used to attach (all) the diode carrier.

The diode carrier may include:
- a (rectangular) first portion bearing the one or more diodes;
- and a (rectangular) electrical-connection second portion, said portion leading to and even extending beyond the edge face of the laminated glazing.

This second portion may be (much) longer than the first portion and/or narrower than the first portion. The diode carrier may include a diode-bearing first portion that is apertured (in order to be more inconspicuous).

Preferably, the first portion is at least 2 mm wide. The diode carrier may have a doglegged shape and in particular be L-shaped.

The diode carrier may be associated with a flat connector that extends as far as to the edge face of the glazing and that even extends beyond said face. A flexible connector that is able to adapt to the curvature of the glazing, including a plastic (PEN or polyimide for example) is preferred. The width (dimension along the edge face) of the flat connector may be smaller than or equal to the dimension of the diode carrier along the edge face.

The glazing may include a plurality of groups of diodes (and therefore, preferably through, apertures) with the same function or distinct functions.

The diodes (on a diode carrier) may emit the same light or light of different colors, preferably not at the same time.

To obtain a larger luminous area and/or different colors there may be—on a given diode carrier—a plurality of rows of diodes or indeed two diode carriers may be placed side-by-side (at least the first portions of the diode carriers, i.e. with the diodes, are placed side-by-side).

Preferably, said set of diodes of the glazed roof (preferably of a road vehicle) forms at least one of the following luminous zones:
- a luminous zone forming a reading light or providing ambient lighting, driver-side and/or co-driver side or for the rear passenger(s);
- a decorative luminous zone;
- a luminous zone including a sign, in particular one made up of one or more letters and/or one or more pictograms, in particular of network connectivity, co-driver side or for the rear passenger(s).

Preferably diodes of said set together form a reading light and are preferably in through apertures and/or on the diode carrier between the face F2 and the face FA.

Preferably, one (of the diodes of said set, or the only) diode forms an indicator light of a remote, touch on/off switch face F3 side and facing the diode, the diode forming said indicator light preferably being on the diode carrier including diodes of said set—which preferably forms a reading light—between the face F2 and the face FA.

The diodes forming a reading light (light for reading) are along a lateral or longitudinal edge of the roof:
- in (at least) one row forming a luminous strip;
- in a circle, or in a square or even in a cross or any other shape.

The roof may comprise a scattering layer or a layer making it easier to locate the diode forming the status-indicator light of a (preferably capacitive) on/off switch of an electrically controllable device: diodes forming a reading light, (SPD) light valve, heating layer, etc.

The diode carrier may be (entirely or partially) in the vision area of the roof and optionally spaced apart from opaque peripheral strips (even forming an opaque frame), such as strips of a (black, dark, etc.) masking enamel. Most often, there is an opaque layer on face F2 and an opaque layer on face F4 or even F3. Their widths are identical or distinct.

The width Li of an opaque peripheral strip on face F2 and/or F3 and/or F4 is preferably at least 10 mm and even 15 mm. Thus, the length of the diode carrier may be larger than Li.

The diode carrier (at least the portion with the one or more diodes or at least the portion without the diodes) may be arranged in or in the vicinity of the region of an opaque layer, in particular a (black) enamel, along a peripheral edge of the laminated glazing, generally on face F2 and/or face F4 or even on face F2 and/or face F3.

Thus, in a first embodiment, the diode carrier may even be located in a region of the roof, in which region the exterior glass is entirely (or partially) opaque because of the presence of an opaque layer (the most external opaque layer), such as a layer of (black) enamel, on F2. This opaque layer may, in this region of the roof, be an unapertured layer (continuous background) or a layer with one or more discontinuities (areas without opaque layer), said layer for example taking the form of a set of optionally geometric (circular, rectangular, square etc.) motifs that are of identical or distinct size (of size that decreases with distance from the edge face and/or the motifs getting further and further apart with distance from the edge face).

In this first embodiment, the one or more diodes or even the diode carrier may be visible only from the interior and therefore masked by the opaque layer on face F2.

The diode carrier may be placed in a region of the roof, in which region the interior glass is opaque because of the presence of an opaque layer (the most internal opaque layer), such as a layer of (black) enamel, preferably on F4 or even on F3. This opaque layer then includes at least one or more than one reserves (produced using a mask during deposition or by removing the opaque layer, in particular with a laser) in line with each diode. This opaque layer for example takes the form of a set of optionally geometric (circular, rectangular, square, etc.) opaque motifs that are of identical or distinct size (of size that decreases and/or the motifs getting further and further apart with distance from the edge face). Zones between the opaque motifs are in line with the diodes.

By way of diodes, mention may be made of the OSLON BLACK FLAT range sold by OSRAM. For red light, mention may be made of the following diode, which is sold by OSRAM: OSLON BLACK FLAT Lx H9PP. For orange (amber) light, mention may be made of the following diode, which is sold by OSRAM: LCY H9PP. For white light, mention may be made of the following diodes, which are sold by OSRAM: LUW H9QP and KW HxL531.TE where x=is the number of chips in the diode (4 or 5 for example).

By way of flexible PCB, mention may be made of the AKAFLEX® range of products (in particular the PCL FW) from KREMPEL.

In reverse-mount diodes, the face of the diode carrier face F3 side may be textured (embossed, etc.) to form the collimating optics according to a) (first textured plate) or even a portion of the collimating optics according to b) (the first textured plate).

In one embodiment of the vehicle, it includes at least one control unit for driving the diodes and even at least one sensor, in particular for detecting luminosity. A control unit for driving the diodes may be in the laminated glazing, on or off the diode carrier.

Preferably, the glazed roof according to the invention meets current motor-vehicle specifications in particular with respect to light transmittance $T_L$ and/or energy transmittance $T_E$ and/or energy reflectance $R_E$ and/or even with respect to total solar transmittance TST.

For an automobile roof, one or more of the following criteria are preferred:

$T_E$ of at most 10% and even from 4 to 6%;
$R_E$ (preferably face F1 side) of at most 10%, better still from 4 to 5%;
and TTS<30% and even <26%, even from 20 to 23%.

The $T_L$ may be low, for example at most 10% and even from 1 to 6%.

In order to limit heating of the passenger compartment or to limit the use of air conditioning, one of the glazings at least (preferably the exterior glass) is tinted, and the laminated glazing may also include a layer that reflects or absorbs solar radiation, preferably on face F4 or on face F2 or F3, in particular a transparent electrically conductive oxide layer, i.e. what is called a TCO layer, (on face F4) or even a stack of thin layers comprising at least one TCO layer,
or stacks of thin layers comprising at least one silver layer (on F2 or F3), the or each silver layer being placed between dielectric layers.

It is possible to place both a (silver-containing) layer on face F2 and/or F3 and a TCO layer on face F4.

The TCO layer (of a transparent electrically conductive oxide) is preferably a layer of fluorine-doped tin oxide ($SnO_2$:F) or a layer of mixed indium tin oxide (ITO).

Other layers are possible, among which thin layers based on mixed indium zinc oxides (referred to as "IZOs"), based on gallium-doped or aluminum-doped zinc oxide, based on niobium-doped titanium oxide, based on cadmium or zinc stannate, or based on tin oxide doped with antimony. In the case of aluminum-doped zinc oxide, the doping level (i.e. the weight of aluminum oxide divided by the total weight) is preferably lower than 3%. In the case of gallium, the doping level may be higher, typically comprised in a range extending from 5 to 6%.

In the case of ITO, the atomic percentage of Sn is preferably comprised in a range extending from 5 to 70% and in particular from 10 to 60%. For layers based on fluorine-doped tin oxide, the atomic percentage of fluorine is preferably at most 5%, and generally from 1 to 2%.

ITO is particularly preferred, in particular with respect to $SnO_2$:F. Being of higher electrical conductivity, to obtain a given emissivity level its thickness may be smaller. Easily deposited by a cathode sputtering process, in particular a magnetron cathode sputtering process, these layers are characterized by a lower roughness and therefore a lower tendency to foul.

One of the advantages of fluorine-doped tin oxide is, in contrast, that it is easy to deposit by chemical vapor deposition (CVD), which, contrary to the cathode sputtering process, does not require a subsequent heat treatment, and may be implemented on a float plate glass production line.

By "emissivity", what is meant is normal emissivity at 283 K as defined in standard EN12898. The thickness of the (TCO, etc.) low-emissivity layer is adjusted, depending on the nature of the layer, so as to obtain the desired emissivity, which depends on the sought-after thermal performance. The emissivity of the low-emissivity layer is for example lower than or equal to 0.3 and in particular to 0.25 or even to 0.2. For layers made of ITO, the thickness will generally be at least 40 nm, or even at least 50 nm and even at least 70 nm, and often at most 150 nm or at most 200 nm. For layers made of fluorine-doped tin oxide, the thickness will generally be at least 120 nm, or even at least 200 nm and often at most 500 nm.

The low-emissivity layer for example comprises the following sequence: high-index underlayer/low-index underlayer/TCO layer/optional dielectric overlayer.

By way of example of a preferred low-emissivity layer (protected during a temper) the following may be chosen: (<40 nm) high-index underlayer/(<30 nm) low-index underlayer/ITO layer/(5-15 nm) high-index overlayer/(<90 nm) low-index barrier overlayer/(<10 nm) last layer.

Mention may be made by way of low-emissivity layers of those described in patent US2015/0146286, on face F4, in particular in examples 1 to 3.

In one preferred embodiment:
the first and/or second glazing is tinted and/or the lamination interlayer is tinted in all or some of its thickness (in particular away from the side of the surface most exposed to light, often the surface where degradation occurs);
and/or face F2 or face F3 or face F4—preferably face F4—of the glazed roof is coated with a low-emissivity layer, in particular one comprising an electrically conductive transparent oxide layer (i.e. what is called a TCO layer) and in particular a stack of thin layers containing a TCO layer or a stack of thin layers containing one or more silver layers;
and/or face F2 or face F3 or face F4—preferably face F3—of the glazed roof is coated with a solar-control layer, in particular one comprising an electrically conductive transparent oxide layer (i.e. what is called a TCO layer) and in particular a stack of thin layers containing a TCO layer or a stack of thin layers containing one or more silver layers;
and/or a tinted additional (polymeric) film (such as a film of polyethylene terephthalate PET, etc.) is between faces F2 and F3 or (adhesively bonded) to F4, even to face F1.

In particular, the face F4 of the glazing is coated with a transparent functional, in particular low-emissivity, layer that preferably contains a TCO layer comprising a zone (supplied with electricity and that therefore forms an electrode) forming a touch button (for controlling the first luminous area).

The invention of course relates to any, in particular motor, vehicle including at least one roof such as described above.

The invention lastly relates to a process for manufacturing the roof such as that described above and that includes the following steps:
cutting, for example automatically (with a robot) the lamination interlayer,
which takes the form of a single leaf (preferably of optionally tinted PVB and even acoustic PVB) or a composite PVB/plastic functional film sheet or a composite PVB/plastic functional film/PVB sheet preferably of thickness of at most 0.9 mm and even of thickness of at most 0.4 mm, to form the preferably through and local apertures (which are geometric: circular, square or rectangular and in particular the same shape as the diodes), the apertures preferably being equal (and not greater) in number than the diodes;
or the (preferably PVB) lamination interlayer including a first (preferably PVB) sheet and a second (preferably PVB) sheet, in particular of thickness of at most 0.4 mm and even of thickness of at most 0.2 mm, the first (preferably PVB) sheet, which is preferably of thickness of at most 0.9 mm, is cut (automatically) to form the preferably through and local apertures; and assembling the laminated glazing, with the diodes (and the collimating optics, which are preferably individual, above all if the preferably through apertures are individual) housed in one or more preferably through or blind apertures that are larger than the size of the diodes, preferably larger by at most 1 mm, better still by at most 0.5 mm or even by at most 0.2 mm or at most 0.1 mm, the optional second sheet being between the back face of a diode carrier and face F2 or face F3 if the diode(s) are reverse-mount diodes.

Preferably, the one or more diodes are surface mount devices, preferably on a face that is what is called the front face, oriented face F3 side, of a flexible diode carrier, in particular a transparent (flexible) plastic film with the front face placed against the PVB sheet or leaf with the one or more preferably through apertures, said diode carrier preferably extending beyond the edge face of the laminated glazing. The back face is for example against face F2 (F3 if reverse mounted) or adhesively bonded face F2 (F3 if reverse mounted) side in particular, and a PVB sheet (which is tinted for example and/or acoustic) is between the back face and face F2 (F3 if reverse mounted), said sheet in particular being thinner than the (PVB or composite) sheet with the blind or through apertures.

In particular, the preferably individual (one per diode) collimating optics may be (pre)mounted on the diodes (collimating optics on the front face of the package and/or via the peripheral surround against the edge faces of the package of the diodes) and/or the diode carrier.

The lamination (application of pressure, heat) which may influence the width of the one or more apertures is achieved by reflow of the interlayer. During the reflow, the lamination interlayer (the first sheet or the composite sheet or leaf) with the aperture that is larger than the diode and even the collimating optics, may spread until it makes contact with the edge face of the diode (of its package) or even with the collimating optics and in particular with the peripheral extension of the collimating optics. Furthermore, for a through aperture, the lamination interlayer (PVB sheet or composite sheet) may spread by reflow to lie between said exit face of the collimating optics and the face F3 without however facing the emitting face of the chip, with the functional portion.

In particular (before the assembly) the collimating optics, or even each collimating optics, is (pre)mounted on a (dedicated) diode, in particular on the package of the diode (on the front face of the package or on its edge face, in particular via the peripheral extension of the collimating optics) and/or (pre)mounted on the diode carrier, in particular via the peripheral extension of the collimating optics.

In the present invention, the expressions "blind hole" and "blind aperture" designate the same thing.

In the case of a through aperture in a PVB sheet and of the addition of a (transparent, PET, etc.) functional plastic film optionally bearing a preferably transparent functional coating and even another PVB sheet face F3 side, the exit face of the collimating optics (which is preferably textured) may make contact (the contact being via the texture for example) or be spaced apart from the main face, face F2 side, i.e. face of the plastic film or functional coating (if face F2 side). It may be preferable not to pierce the coating or even the film.

The present invention will now be described in greater detail with reference to the appended figures, in which:

FIG. 1 shows a top view of a luminous laminated glazed roof 100' of a motor vehicle 1000 according to a first embodiment of the invention and a detail view of the diodes forming a reading light.

FIG. 1' shows a schematic partial cross sectional view of the laminated glazed roof in one variant of the first embodiment of the invention.

FIG. 1" shows a schematic partial cross sectional view of the laminated glazed roof in one variant of the first embodiment of the invention.

FIGS. 1*a*, 1*b*, 1*c*, 1*e* and 1*d* show face-on views of diode carriers internal face side (oriented toward the passenger compartment).

FIG. 1'*a* shows a schematic partial cross sectional detail view of the laminated glazed roof 200' according to one embodiment of the invention.

FIG. 1'*b* shows a front view (face F3 side) of a part bearing the collimating optics.

FIG. 1'*c* shows a back view (face F2 side) of this part bearing the collimating optics.

FIG. 1'*z* shows an elevation view of this part bearing the collimating optics.

FIG. 1'*d* shows a schematic partial cross sectional detail view of the laminated glazed roof, according to one embodiment of the invention.

FIG. 1'*e* shows a schematic partial cross sectional detail view of the laminated glazed roof according to one embodiment of the invention 3.

FIG. 1'*f* shows a schematic partial cross sectional detail view of the laminated glazed roof, according to one embodiment of the invention.

FIG. 1'*g* shows a schematic partial cross sectional detail view of the laminated glazed roof, according to one embodiment of the invention.

FIG. 1'*i* shows a perspective view of a PVB sheet containing through apertures in the case of diodes 4 in a row.

FIGS. 1*i*, 1*j*, 1*k*, 1*l*, 1*m*, 1*n*, 1*o* show schematic partial exploded cross sectional views of the luminous laminated glazed roof according to the invention, illustrating manufacturing processes.

FIG. 1*bis* shows a schematic partial exploded cross sectional view of the laminated glazed roof 100*bis*, according to one embodiment of the invention.

FIG. 1*ter* shows a schematic partial exploded cross sectional view of the laminated glazed roof 100*ter*, according to one embodiment of the invention.

FIG. 2*a* shows a schematic partial cross sectional detail view of the laminated glazed roof, according to one embodiment of the invention.

FIG. 2*b* shows a schematic partial cross sectional detail view of the laminated glazed roof, according to one embodiment of the invention.

FIG. 3*a* shows a schematic partial cross sectional detail view of the laminated glazed roof 30' according to one embodiment of the invention.

FIG. 4*a* shows a schematic partial cross sectional detail view of the laminated glazed roof 30' according to one embodiment of the invention and FIGS. 4*b* and 4*c* a bottom view and a perspective view, respectively, of examples of reverse-mount diodes.

FIG. 5*a* shows a schematic partial cross sectional detail view of the laminated glazed roof 500 according to one variant of the embodiment of the invention of FIG. 4*a*.

FIG. 6*a* shows a schematic partial cross sectional detail view of the laminated glazed roof 600 according to one embodiment of the invention, one variant of the embodiment of the invention of FIG. 4*a*.

FIG. 2'*a* shows a schematic partial cross sectional detail view of the laminated glazed roof 200' according to one embodiment of the invention.

FIG. 2'*b* shows an elevation view of this part bearing the collimating optics.

FIG. 2'*c* shows a front view (face F3 side) of a part bearing the collimating optics.

FIG. 2'*d* shows a schematic partial cross sectional detail view of the laminated glazed roof, according to one embodiment of the invention.

FIG. 2'*e* shows a schematic partial cross sectional detail view, of the laminated glazed roof according to one embodiment of the invention.

FIG. 3'*a* shows a schematic partial cross sectional detail view of the laminated glazed roof, according to one embodiment of the invention.

FIG. 4'*a* shows a schematic partial cross sectional detail view of the laminated glazed roof, according to one embodiment of the invention.

FIG. 5'*a* shows a schematic partial cross sectional detail view of the laminated glazed roof according to one embodiment of the invention. FIG. 5'*b* shows a face-on view indicating the outline of the film 5 with respect to the PCB 3.

FIG. 6'*a* shows a schematic partial cross sectional detail view of the laminated glazed roof, according to one embodiment of the invention.

FIG. 7'*a* shows a schematic partial cross sectional detail view of the laminated glazed roof, according to one embodiment of the invention.

FIG. 2'*bis* shows a schematic partial exploded cross sectional view of the laminated glazed roof according to one embodiment of the invention.

For the sake of simplicity the roofs have been shown flat but are in fact curved. The elements shown are not to scale.

FIG. 1 shows a top view of a luminous laminated glazed roof of a motor vehicle 1000 according to a first embodiment of the invention with two sets of diodes 4, one of which forms a rear reading light and the other a front reading light.

A first set 102 of eight diodes 4 (cf the detail view) is on a first printed circuit board, i.e. PCB board (not shown here), which is integrated between the two glazings of the laminated glazing, eight diodes forming a circle being placed in the vision area in a longitudinal edge zone in the vicinity of an external peripheral masking zone 15 (opaque enamel, etc.) on the exterior glazing, and an internal masking zone (opaque enamel, etc.) of similar size on the interior glazing (not shown).

Alternatively, the reading light is masked by the layer 15' and one or more reserves are produced in the internal masking zone or even in a (transition) zone containing an alternation of the masking zone (opaque layer, such as an opaque enamel) and transparent zone of the interior glazing.

Collimating optics are associated with the diodes and are between the front surface of the diodes and the face F3 of the laminated roof (internal face of the interior glazing).

FIG. 1' shows a schematic partial cross sectional view of the laminated glazed roof 100' in one variant of the first embodiment of the invention. The laminated glazed roof 100', which is curved, includes:
- a first glazing 1, for example made of VG10 glass and of 2.1 mm thickness, forming the exterior glazing, with first and second main faces 11, 12 called face F1 and face F2, respectively;
- a second glazing 1', forming the interior glazing, for example made of TSA (or clear or extra-clear) glass and of 2.1 mm thickness or even 1.6 mm thickness or even of less than 1.1 mm thickness (in particular chemically toughened glass), with third and fourth main faces 13, 14 called face F3 and face F4, respectively, face F3 optionally being coated with a (heating, low-emissivity, etc.) functional layer;
- between face F2 and face F3, which form the internal faces 12,13 of the laminated glazing, a lamination interlayer 20, 21, 22 made of polymeric material, here made of PVB, of thickness $E_t$ of preferably about 1 mm or less, namely a layer (a sheet) of PVB 21 with a face FB making adhesive contact with the face F3 and containing a set of through apertures (two may be seen here) between a face FA against a diode carrier 3 and the face FB, the thickness $E_A$ between these faces FA and FB corresponds to the height H of the apertures, about 0.76 mm for example for a conventional PVB sheet (RC41 from Solutia or Eastman) or as a variant, if necessary, an acoustic (trilayer or quadlayer) PVB, for example of about 0.81 mm thickness; and
- a for example low-emissivity (ITO, etc.) functional layer 16, on face F4.

Inorganic surface mount device (SMD) light-emitting diodes 4 that for example emit white light are surface mounted on the diode carrier.

The diode carrier is a printed circuit board (PCB board) 3 of thickness e'2 of at most 0.2 mm and preferably of 0.1 mm to 0.2 mm. The diode carrier 3 extends beyond the edge face of the laminated glazing. It for example includes a diode-bearing portion, and an electrical-connection portion extending beyond the glazing and (partially) between the internal and external peripheral masking layers 15', 15. The layer 15' may be partially on the functional layer 16.

The face called the front face 30 of the diode carrier 3 bears conductive tracks facing the face F3 and the back face 30' is against face F2 or face 12. Each diode has an emitting face emitting in the direction of the interior glazing 1', and each diode has an edge face.

For each of the diodes, the lamination interlayer therefore comprises a through aperture 20*a* encircling the edge face of the diode 4 and even making contact with a collimating optics, in particular the peripheral extension preferably forming a surround of the diode or diodes.

The diodes 4 (with a single semiconductor chip here) are of square shape of length of about 5 mm or less. The diodes are of thickness e2 smaller than the height H of the hole. The diodes do not protrude from the hole, as if they did it would risk weakening the glass by creating points of stress. Furthermore, the diodes must preferably not be spaced too far apart from the face F3, as this would risk creating too many air bubbles.

The PCB board chosen is the thinnest possible, flexible and in the case shown here where the diodes 4 are in the vision area (outside of the periphery with the internal and external masking layers 15 and 15') even preferably the most inconspicuous possible (minimum width or even transparency), the board for example including a transparent film such as a film of PET, PEN or a polyimide and even, as regards the printed circuit, transparent connection tracks (rather than tracks made of copper or another metal, unless sufficiently thin).

The following are for example chosen, during manufacture: a first sheet 21 with through apertures and a second sheet 22 of PVB on the side of the back face 30' of the PCB board. By reflow, the two sheets are joined, the interface (here shown by the dotted line) possibly being visible.

For each diode with a reading-light function, to better direct the light beam, a collimating optics 5 is furthermore used, said lens being housed in the through aperture accommodating the diode and being mounted on the carrier 3 or on the diode itself. Here, the collimating optics 5, which is transparent, has an exit face with a textured portion 50 (two-dimensional motifs, cones, pyramids) making contact with the face F3 (or as a variant spaced apart therefrom) and a peripheral surround 53 making contact with the edge face of the diode and with the walls of the through aperture and possibly touching the front face 30 of the diode carrier.

The layer 16 may comprise a zone forming a touch on/off switch for turning on the reading light.

FIG. 1″ shows a schematic partial cross sectional view of the laminated glazed roof in one variant of FIG. 1', in which:
- a functional layer 17, for example a heating layer, is on face F3; and
- the layer on face F4 is optionally removed.

The layer 17 may comprise a zone forming a touch on/off switch for turning on the reading light.

The following may be added to the carrier 3: a diode forming a status indicator light of the touch-switch zone, and its associated through aperture.

FIGS. 1a, 1b, 1c, 1e and 1d show face-on views of diode carriers internal face side (oriented toward the passenger compartment) with different arrangements of diodes.

The PCB board 3 includes a diode-bearing first portion 31 and a narrower electrical-supply portion 32 leading to beyond the edge face of the roof.
- in FIG. 1a nine diodes are used, eight diodes 4 in a circle forming a reading light and one central diode 4' forming a status indicator light;
- in FIG. 1b nine diodes are used, eight diodes 4 in a circle forming a reading light and one central diode 4' forming a status indicator light and a portion 3d of the diode-bearing carrier is apertured for greater inconspicuousness;
- in FIG. 1c fifteen diodes are used, fourteen diodes 4 in a square forming a reading light and one central diode 4' forming a status indicator light;
- in FIG. 1d seventeen diodes are used, sixteen diodes 4 in a cross forming a reading light and one central diode 4' forming a status indicator light;
- in FIG. 1e a row of six diodes 4 has been used and for example the L-shaped carrier 3 contains a dogleg, an adhesive 6 forming a seal if against face F2.

FIG. 1'i shows, during manufacture, the addition of the sheet 21 with the through apertures 20.

FIG. 1'a shows a schematic partial cross sectional detail view of the luminous laminated glazed roof according to one embodiment of the invention.

Each diode, preferably a power diode for a reading light, is an electronic component including a semiconductor chip 41, and is equipped with a polymeric or ceramic peripheral package 42 encapsulating the edge face of the electronic component.

The lamination interlayer (by reflow during lamination) does not here spread as far as to between the what is called front surface 42' of the package and the face F3 and in particular as far as to the front face 40 of the diode (emitting face of the chip or more precisely face of the assembly consisting of the chip and the encapsulating material 43, which has a protective or wavelength-converting function (luminophore)). The package may have a profile 42a that flares with distance from the chip 41.

The electronic component 4 thus generally includes a support 42b, here what is called a lower portion of the package bearing the semiconductor chip and a reflector that is flared toward face F3, here an upper portion 42a of the package.

The material 43 may be a transparent resin and/or a resin mixed with a luminophore.

The luminophore may be just on the chip 41. The material 43 may be below flush with the surface (of the reflector) 42a, in particular creating an air gap that may be useful.

Examples of diodes are described in the document "les leds pour l'éclairage" by Laurent Massol, Edition dunod on pages 140 and 141.

The package is for example made of epoxy or a ceramic. A polymeric package may optionally be compressed (the final thickness after lamination may be smaller than the initial thickness) during the lamination. The (polymeric) package may be opaque.

On the back face of the diode 4 (of the package), there are two areas 44 of electrical contact to zones 33 (isolated by an etch 33' etc.) of an electrically conductive layer 33 on the carrier 3.

The part 5 forming the collimating optics of the diode 4 includes a smooth entrance face 51 (spaced apart from the front surface 40) and a textured exit face 52, in particular a textured functional central zone 54, here an array of recessed pyramids. The part 5 includes a peripheral extension 53, preferably taking the form of a hollow body or surround for attaching to the diode carrier 3, for example with a glue 61, and/or to the diode, and/or forming a barrier to the PVB (by way of precaution).

The part 5 for example has a square outline. It is for example made of PMMA and obtained by molding. The walls 53 preferably make contact with the PVB (cavity forming the through aperture). The part 5 is here housed entirely in the through aperture 20a.

The part 5 comprises a portion housing the diode 4. The walls 53 of the surround include two or better still four internal stubs 55a for holding the diode via its edge face.

The functional zone of the textured face is located facing the front surface 40. The peripheral zone facing the front surface 42' of the package 42 may optionally be textured or even serve to create an air gap between the motifs and the face F3.

FIG. 1'b shows a front view (face F3 side) of this part bearing the collimating optics 5.

FIG. 1'c shows a side view showing the back (face F2 side) of this part bearing the collimating optics 5, here an array of recessed pyramids.

FIG. 1'z shows another view, here a back view (face F2 side), of this part bearing the collimating optics 5.

FIG. 1'd shows a schematic partial cross sectional detail view of the laminated glazed roof according to one embodiment of the invention, which differs from FIG. 1'a in that the part 5 is adhesively bonded to the periphery of the front surface 42' of the package (rather than or in addition to being bonded to the carrier 3) i.e. peripherally to the chip 41. Preferably, the entrance face 51 is spaced apart from the diode 40 (central zone of the front face).

As a variant, it may be press fitted onto the diode (the package), and the periphery extension may be spaced apart from the diode carrier 3.

FIG. 1'e shows a schematic partial cross sectional detail view of the laminated glazed roof according to one embodiment of the invention, which differs from FIG. 1'a in that the part 5 is press fitted onto the diode (the package), and the peripheral extension is spaced apart from the diode carrier 3.

FIG. 1'f shows a schematic partial cross sectional detail view of the laminated glazed roof according to one embodiment of the invention, which differs from FIG. 1'a in that the diode is mounted, on connection tracks 18 (layer, etc.) that are isolated 18', on face F3 (removal of the diode carrier and back PVB sheet). The (electrical) connections are on face F2 and take the form of an electrically conductive layer 18 that is in particular transparent (electrically conductive zones isolated by an isolating device 18', for example an insulating strip 18' of sub-millimeter-sized width that is for example formed by laser etching).

FIG. 1'g shows a schematic partial cross sectional detail view of the laminated glazed roof according to one embodiment of the invention, which differs from FIG. 1'a in that:
  the back PVB sheet has been removed and replaced by an adhesive;
  and above all in that the PVB sheet 21 contains a blind hole 20i (produced in a single sheet or using two sheets one of which contains a through aperture) rather than a through aperture, the exit face then preferably being isolated from the bottom PVB sheet with a part (second bottom) that is adhesively bonded to the optical part 5.
  For example the textured plate 5 is protected from the PVB sheet, this bottom for example comprising a surround adhesively bonded by a glue 62 to the surround of the collimating optics.

As shown in FIG. 1'i with respect to the manufacture of the roof, the doglegged PCB board therefore includes a first (rectangular) portion 31 bearing the diodes 4 (and with the dogleg) and a second (rectangular) portion 32 for electrical connection, for example two copper tracks 33 with an isolating line 34 leading to and extending beyond the edge face of the roof. This second portion may be (much) longer than the first portion.

Here, the emitting face is set back from the front surface 42' of the package, which therefore sets the maximum thickness e2 of the diode 4.

FIGS. 1i, 1j, 1k, 1l, 1m, 1n and 1o show schematic partial exploded cross sectional views of the luminous laminated glazed roof according to the invention, illustrating manufacturing processes involving a preferably transparent, flexible and thin (less than 0.2 mm thick) diode carrier 3 with a front face 30 against a face of a PVB sheet with the apertures (or the blind holes) and a back face 30' toward the face F2. The carrier 3 extends beyond the edge face of the laminated glazing.

Preferably, before lamination, each local aperture is larger than the assembly consisting of the diode 4 and the collimating optics 5.

The collimating optics are premounted on the PCB carrier or on the (SMD) diodes.

In FIG. 1i, a single PVB sheet 21 with the through apertures, said sheet possibly being a conventional and/or acoustic and/or tinted PVB sheet, has been used.

In FIG. 1j, the following have been used:
a first PVB sheet 21 with the through apertures, said sheet possibly being a conventional and/or acoustic and/or tinted PVB sheet;
and a second PVB sheet 22, on the side of the back face 30' of the carrier 3, said sheet possibly being a for example tinted conventional PVB sheet that is thinner than the first sheet (the latter allowing for the thickness of the diodes).

In FIG. 1k, the following have been used:
a first PVB sheet 21 with the through apertures, said sheet possibly being a conventional and/or acoustic and/or tinted PVB sheet; and
a transparent (PET, etc.) film 3 bearing a functional layer 33' face F3 (or face F2 as a variant) side, for example a low-emissivity or solar-control layer, here for example preassembled with another PVB sheet 23 (that is thinner than the first sheet) face F3 side, said film having essentially the same area as the faces F2 and F3. Alternatively, the transparent film 3' with the layer 33' is preassembled with the first sheet and the second sheet or just with the first sheet before the blind or through apertures are produced in the thickness of the PVB sheet 21, rather than in the thickness of the PVB sheet/PET film conductor.

The layer 33' is preferably away from (neither pierced nor touched by) the holes, which are then in the PVB sheet 21, and the same goes for the carrier 3. The layer 33' may be face F2 or face F3 side.

In FIG. 1l or 1m, the following have been used:
a first PVB sheet 21 with the through apertures, said sheet possibly being a conventional and/or acoustic and/or tinted PVB sheet;
locally, on the periphery, a transparent (PET etc.) film bearing a functional layer 33' face F2 (or face F3 as a variant) side, for example forming a capacitive touch on/off switch (for turning on the diodes forming the reading light); and
another PVB sheet 23 (that is thinner than the first sheet) face F3 side or alternatively an adhesive 6' bonding the film 3' (FIG. 1m).

In FIG. 1n, the following have been used:
a first PVB sheet 21 with the through apertures, said sheet possibly being a conventional and/or acoustic and/or tinted PVB sheet;
and a second PVB sheet 22 face F2 side, said sheet possibly being a for example tinted conventional PVB sheet that is thinner than the first sheet (the latter allowing for the thickness of the diodes); and
the diodes 4 are reverse-mount diodes, i.e. the light passes through the carrier 3 which is (drilled if necessary) against or adhesively bonded to face F3.

In FIG. 1o, a first PVB sheet 21 with the apertures forming blind holes 20i, said sheet possibly being a conventional and/or acoustic PVB sheet, has been used. Preferably, each, here blind, local aperture is larger than the assembly consisting of the diode 4 and collimating optics 5, before lamination. The peripheral extension 53 makes contact with the walls of the blind aperture 20i after lamination.

FIG. 1bis shows a schematic partial exploded cross sectional view of the laminated glazed roof, according to one embodiment of the invention.

It differs from that shown in FIG. 1" in that the through aperture 20a is common to more than one diode 4 and in that a portion 57 of the collimating optical part 5 forms a spacer between the diodes 4. The peripheral extension 53 makes contact with the walls of the aperture 20a after lamination.

FIG. 1ter shows a schematic partial exploded cross sectional view of the laminated glazed roof according to one embodiment of the invention, which differs from FIG. 1bis in that the spacer 58 is a separate part from the transparent collimating optical part 5 mounted on the carrier 3. The peripheral extension 53 makes contact with the walls of the aperture 20a after lamination.

FIG. 2a shows a schematic partial cross sectional detail view of the laminated glazed roof according to one embodiment of the invention, which differs from FIG. 1'a in that the lateral mounting part 56 forming the surround of the diode and even housing it is separate from the textured portion 5 (placed on top, etc.). The exit face may be spaced apart from face F3.

FIG. 2b shows a schematic partial cross sectional detail view of the laminated glazed roof according to one embodiment of the invention, which differs from FIG. 1'a in that:

the lateral mounting part 56 forming the surround of the diode 4 and even housing it is separate from the textured portion (plate) 5 (placed on top, etc.); and the through aperture has been replaced by a blind hold 20*i*.

The lateral mounting part 56 forms a protective part forming a second bottom. The textured exit face makes contact with or is spaced apart from the face F3 and from the bottom 57.

Figure 1J:
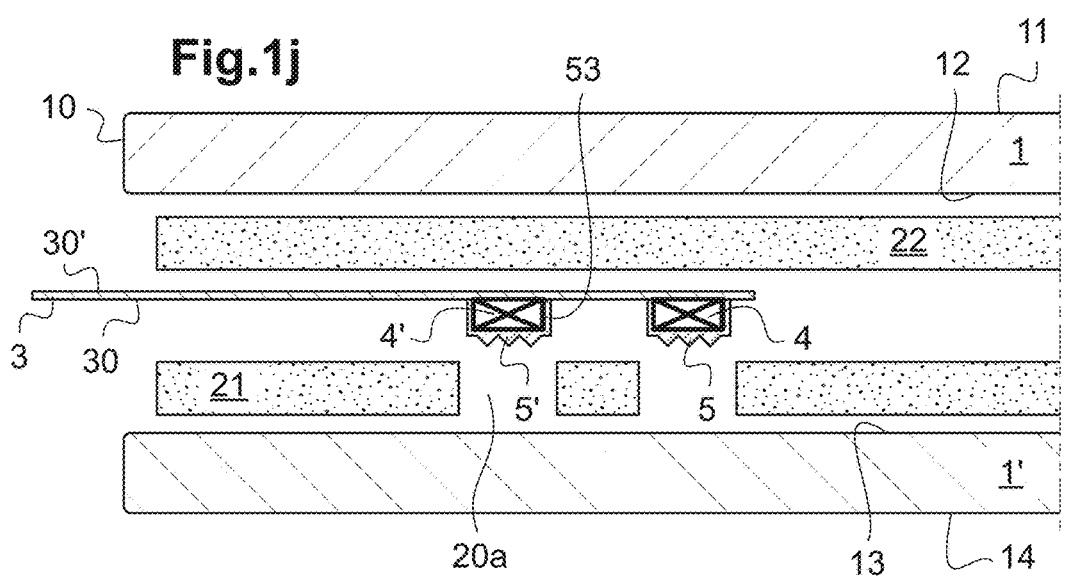
Figure 1K:
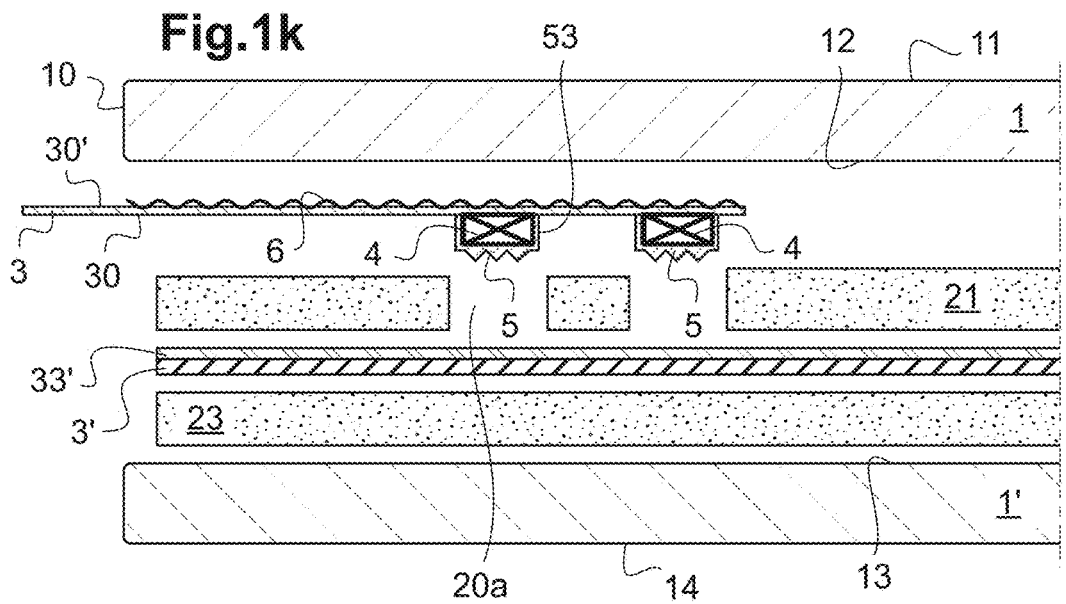
Figure 1L:
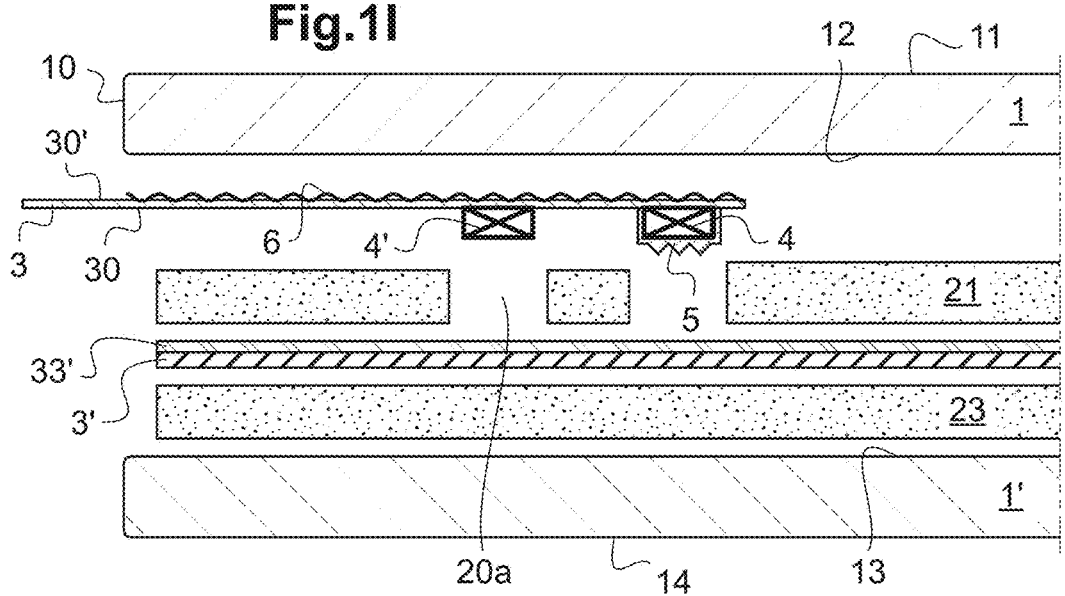

FIG. 3*a* shows a schematic partial cross sectional detail view of the laminated glazed roof according to one embodiment of the invention, which differs from FIG. 1'*a* in that there is no peripheral surround, the textured plate being adhesively bonded by a glue 62 to the package 42*a* (surface 42'), on the periphery of the front face of the chip.

Figure 4A:
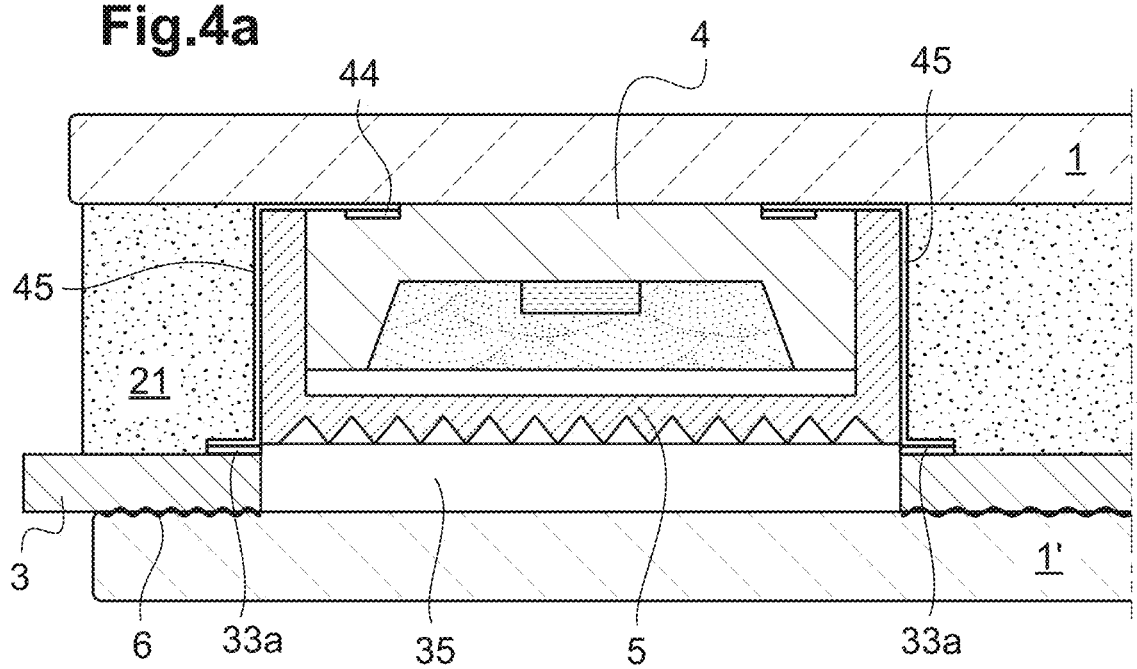

FIG. 4*a* shows a schematic partial cross sectional detail view of the laminated glazed roof according to one embodiment of the invention, which differs from FIG. 1'*a* in that the diodes are reverse-mount diodes and therefore the diode carrier is face F3 side (adhesively bonded via an adhesive to face F3) and the contacts 44 are connected by lateral contacts 45, such as metal fins, to the connection tracks back face (toward F2) side of the carrier. The carrier may be drilled (hole 35) in order to (better) let pass the light. The peripheral surround is between the fins 45 and the edge face of the diode.

Figure 4B:
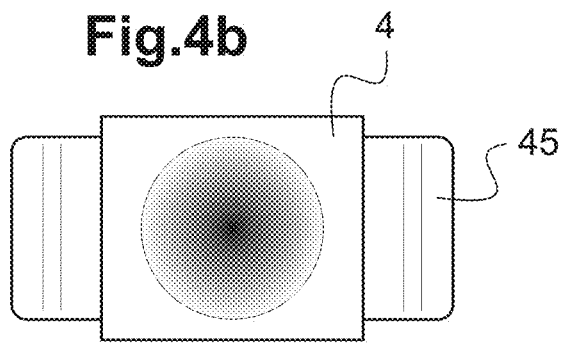
Figure 4C:
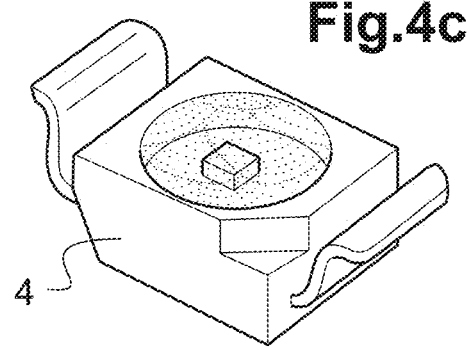

FIGS. 4*b* and 4*c* are a bottom view and a perspective view, respectively, of examples of reverse-mount diodes.

Figure 5A:
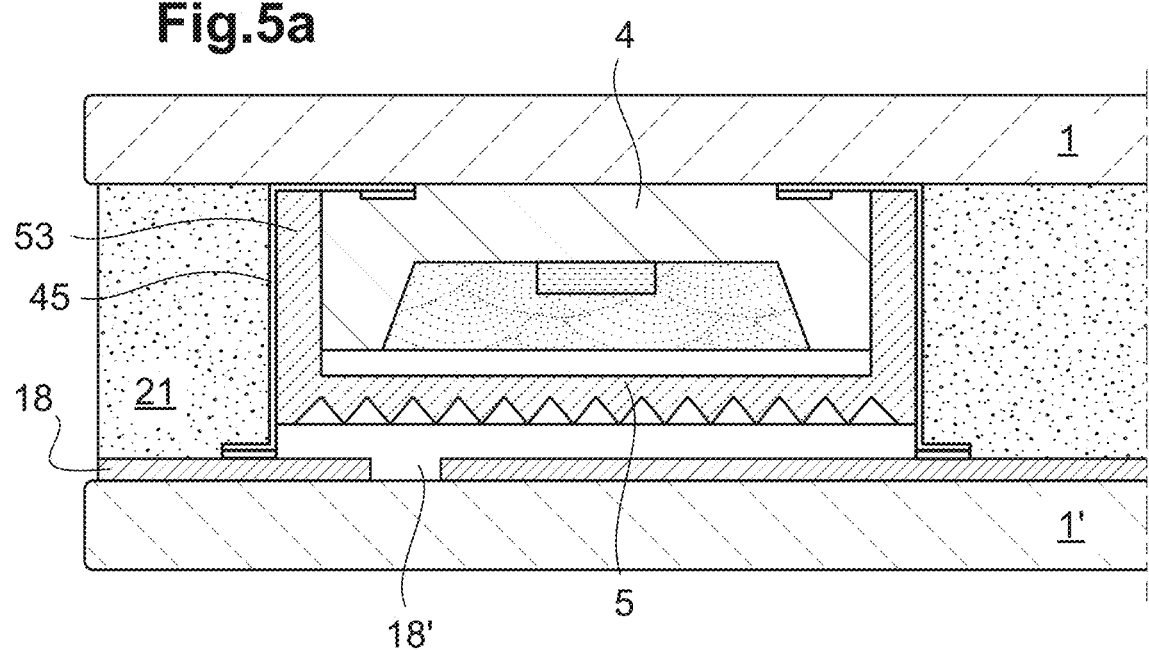

FIG. 5*a* shows a schematic partial cross sectional detail view of the laminated glazed roof according to one variant of the embodiment of the invention of FIG. 4*a*, in which the diode carrier has been removed and the contacts 44 are connected by lateral contacts 45, such as metal fins, to connecting tracks 18 on face F3.

Figure 6A:
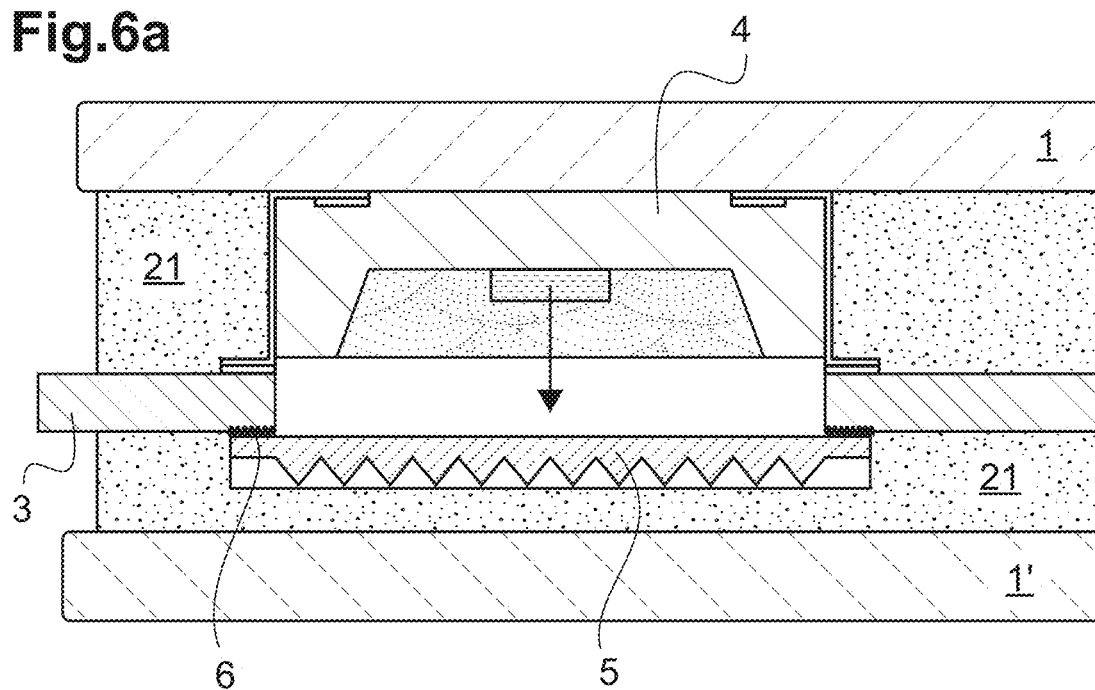

FIG. 6*a* shows a schematic partial cross sectional detail view of the laminated glazed roof according to one embodiment of the invention, a variant of the embodiment of the invention of FIG. 4*a*, in which the front face of the carrier is laminated to face F3 by a PVB sheet 23.

FIG. 2'*a* shows a schematic partial cross sectional detail view of the laminated glazed roof according to one embodiment of the invention, which differs from FIG. 1*a* in that the collimating optics includes two crossed arrays of prisms. A first textured plate 5 with a first array of prisms is placed nearest the diode and with its peripheral surround, which surrounds the diode 4, adhesively bonded to the diode carrier 2 (exit face textured with a first array of prisms). A second textured plate 5' is placed on the exit face of the first plate and adhesively bonded to its extension by a glue 62, a second array of prisms therefore being crossed with the first array of prisms. The entrance face of the second plate 5' makes contact with the first array of prisms.

FIG. 2'*b* shows a partial elevation view of the two textured plates 5, 5' one against the other, with two arrays of prisms of triangular cross section.

Each prism has a half angle at the apex (in the plane orthogonal to the texture) of 45°. The entrance face may be as close as possible to the front surface 40 (while keeping an entrance air gap).

FIG. 2'*c* shows a front view (face F3 side) of this part bearing the collimating optics 5, 55'.

It is analogous to the part described in FIGS. 1'*z* and 1'*c*, for attaching the diode.

FIG. 2'*d* shows a schematic partial cross sectional detail view of the laminated glazed roof according to one embodiment of the invention, which differs from FIG. 2'*a* in that the diode carrier and the PVB sheet that was on the side of its back face have been removed, the electrical connections being on face F2. The (electrical) connections are on face F2 and take the form of an in particular transparent electrically conductive layer 18 (electrically conductive zones isolated by an isolating device 18', for example an insulating strip 18' of sub-millimeter-sized width, for example formed by laser etching).

FIG. 2'*e* shows a schematic partial cross sectional detail view of the laminated glazed roof according to one embodiment of the invention, which differs from FIG. 2'*a* in that:
the through aperture has been replaced by a blind hold;
a part for protecting the collimating optics 5, 5' with the two textured plates (prismatic films crossed on each other) is adhesively bonded by a glue 62' to form a second bottom 53'; and
the back face of the diode carrier 3 is adhesively bonded to face F2 by an adhesive 6.

FIG. 3'*a* shows a schematic partial cross sectional detail view of the laminated glazed roof according to one embodiment of the invention, which differs from FIG. 2'*a* in that the collimating optics with the two textured plates (prismatic films crossed on each other) 5, 5' is a separate part from a surround 56 for attaching to the PCB carrier 3, housing the collimating optics 5, 5'.

FIG. 4'*a* shows a schematic partial cross sectional detail view of the laminated glazed roof according to one embodiment of the invention, which differs from FIG. 2'*a* in that:
the collimating optics with the two textured plates (prismatic films crossed on each other) 5, 5' does not have an attaching surround; and
the collimating optics 5, 5' is adhesively bonded by a glue to the front face of the package.

FIG. 5'*a* shows a schematic partial cross sectional detail view of the laminated glazed roof according to one embodiment of the invention, which differs from FIG. 2'*a* in that the collimating optics is not housed in the through aperture but between face FB and face F3. The collimating optics 5, 5' is an assembly of two prismatic films that are crossed on each other. For example, the prism motifs are produced in each prismatic film in each zone facing the one or more diodes in order not to create too much haze.

FIG. 5'*b* shows a face-on view indicating the outline of the crossed films 5' with respect to the PCB 3 with the portion 31 comprising the diodes 4, 4' and the connecting portion 32 bordering the enamel 15'.

FIG. 6'*a* shows a schematic partial cross sectional detail view of the laminated glazed roof according to one embodiment of the invention, which differs from FIG. 2'*a* in that:
the diodes 4 are reverse-mount diodes; and
the diode carrier is face FB side of the PVB film 21 containing the through aperture and is pierced 35—another PVB film 23 has been added face F3 side on either side of the collimating optics with the two textured plates (prismatic films crossed on each other) 5, 5', said film being adhesively bonded to the front face of the drilled carrier 3.

FIG. 7'*a* shows a schematic partial cross sectional detail view of the laminated glazed roof according to one embodiment of the invention, which differs from FIG. 2'*a* in that:
the diodes 4 are reverse-mount diodes;
the diode carrier 3 is face FB side of the PVB film containing the through aperture; and
the face of the diode carrier 3 face F3 side has been textured (embossing, etc.) to form the first prismatic film of the collimating optics 5 and, with an adhesive bond 62, the second crossed prismatic film 5' is added against face F3.

FIG. 2'*bis* shows a schematic partial exploded cross sectional view of the laminated glazed roof according to one embodiment of the invention.

It differs from that shown in FIG. 1' in that the through aperture 20*a* is common to a group of diodes 4 and a portion of the collimating optical part 5, 5' (prismatic films crossed on each other, with a glue 62 on the periphery) forms a spacer 58 between the diodes 4, 4'.

The invention claimed is:

1. A luminous laminated glazed roof for a vehicle, said roof comprising a laminated glazing including:
   a first transparent glazing, made of, optionally tinted, mineral glass, with first and second main faces; which first transparent glazing is intended to be an exterior glazing;
   a second transparent glazing made of mineral glass, with third and fourth main faces, which second transparent glazing is intended to be an interior glazing;
   between the second and third main faces, which are internal faces of the laminated glazing, transparent lamination interlayer film made of polymeric material, said lamination interlayer film being optionally tinted and having a fifth main face oriented toward the second main face and a sixth main face oriented toward the third main face, the fifth main face optionally making adhesive contact with the second main face and the sixth main face optionally making adhesive contact with the third main face; and
   a set of inorganic light-emitting diodes, each inorganic light-emitting diode including at least one semiconductor chip, each inorganic light-emitting diode including a front surface oriented toward the third main face, the front surface defining a light emitting surface of the inorganic light-emitting diode so that the inorganic light-emitting diode is configured to emit in a direction of the third main face;
   wherein said lamination interlayer is provided, between the fifth main face and the sixth main face, with one or more apertures that are through apertures or that form blind holes;
   wherein each inorganic light-emitting diode is associated with a through aperture or a blind hole housing the inorganic light-emitting diode;
   or wherein at least one group of said inorganic light-emitting diodes is associated with a common aperture that is a common through aperture or a common blind hole housing the group of inorganic light-emitting diodes;
   wherein the laminated glazing furthermore includes a set of collimating optics, each collimating optics being associated with one of the inorganic light-emitting diodes that is in the aperture, or associated with the group of inorganic light-emitting diodes that are in the common aperture and each collimating optics is arranged between the second and third main faces, with at least one functional portion of the collimating optics between the front surface of the inorganic light-emitting diode and the third main face;
   and wherein at least one or each collimating optics, having an entrance face oriented toward the second main face and an exit face oriented toward the third main face, includes:
   a) an array of two-dimensional motifs, oriented toward the exit face,
   or
   b) a prismatic assembly including
      a first array of prismatic motifs, all of the prismatic motifs of the first array being prisms oriented toward the third main face extending longitudinally along an axis or a parallel direction or making an angle of at most 10° to a longitudinal edge face of the roof;
      and a second array of prismatic motifs, which second array is crossed with the first array of prismatic motifs, all of the prismatic motifs of the second array being prisms oriented toward the third main face extending longitudinally in a direction perpendicular to the longitudinal axis of the first prismatic array or making an angle of at most 90±10°.

2. The vehicular luminous laminated glazed roof as claimed in claim 1, wherein at least one or each collimating optics is a part that is monolithic, or that is made up of a plurality of united pieces in the aperture, which part is mounted on a diode carrier and/or mounted on the inorganic light-emitting diode in the aperture or on an inorganic light-emitting diode of the group of inorganic light-emitting diodes, said part including:
   the functional portion of the collimating optics; and
   a peripheral extension, extending in the direction of the second main face along the edge face of the inorganic light-emitting diode or of at least one of the inorganic light-emitting diodes of said group of inorganic light-emitting diodes.

3. The vehicular luminous laminated glazed roof as claimed in claim 2, wherein the peripheral extension is a surround of the inorganic light-emitting diode or of the group of inorganic light-emitting diodes.

4. The vehicular luminous laminated glazed roof as claimed in claim 3, wherein the peripheral extension comprises a housing for accommodating the inorganic light-emitting diode or the group of inorganic light-emitting diodes.

5. The vehicular luminous laminated glazed roof as claimed in claim 1, wherein the inorganic light-emitting diodes are reverse-mount diodes, a face of a diode carrier oriented toward the third main being textured and forming the collimating optics according to a) or a first textured plate of the collimating optics according to b) or wherein the collimating optics comprises a textured plate and forms the collimating optics according to a) or a first textured plate of the collimating optics according to b), said textured plate being between the face of the lamination interlayer oriented toward the third main face and a third main face or being in the aperture.

6. The vehicular luminous laminated glazed roof as claimed in claim 1, wherein at least one or each collimating optics includes:
   a) said array of two-dimensional motifs oriented toward the exit face, including a first textured plate;
   or
   b) said prismatic assembly including said first array of prismatic motifs, all of the prismatic motifs of the first array being prisms oriented toward the third main face extending longitudinally along an axis or in a parallel direction or making an angle of at most 5° to a longitudinal edge face of the roof, and the second array of prismatic motifs, all of the motifs of the second prismatic array being prisms oriented toward the third main face extending longitudinally along a direction perpendicular to the longitudinal axis of the first prismatic array or making an angle of at most 90±10°.

7. The vehicular luminous laminated glazed roof as claimed in claim 1, wherein the motifs are contiguous or essentially contiguous.

8. The vehicular luminous laminated glazed roof as claimed in claim 1, wherein the two-dimensional motifs, which are optionally truncated, have a half angle at the apex ranging from 35 to 55°.

9. The vehicular luminous laminated glazed roof as claimed in claim 1, wherein the two-dimensional motifs, which are optionally truncated, are recessed.

10. The vehicular luminous laminated glazed roof as claimed in claim 1, wherein a flexible diode carrier is pressed against or adhesively bonded to the second main face or the third main face, the diode(s) being reverse mounted, said flexible diode carrier having a thickness e'2 that is at most 0.2 mm.

11. The vehicular luminous laminated glazed roof as claimed in claim 1, wherein each inorganic light-emitting diode is an electronic component equipped with a peripheral package encapsulating an edge face of the electronic component.

12. The vehicular luminous laminated glazed roof as claimed in claim 1, wherein the inorganic light-emitting diodes of said set form a reading light.

13. The vehicular luminous laminated glazed roof as claimed in claim 1, wherein the inorganic light-emitting diodes with their collimating optics are in through or blind apertures of a PVB sheet or in blind or through apertures of a PVB sheet/functional film/PVB sheet or wherein the blind or through aperture is common to the inorganic light-emitting diodes and a portion of the collimating optical part forms a spacer between the inorganic light-emitting diodes or a spacer is a part that is separate from the collimating optical part.

14. A vehicle including at least one luminous laminated glazed roof as claimed in claim 1.

15. The vehicular luminous laminated glazed roof as claimed in claim 1, wherein at least one or each collimating optics includes a first functional planar textured plate that is partially textured in its thickness which has the entrance face oriented toward the second main face facing the inorganic light-emitting diode in the aperture or the group of inorganic light-emitting diodes in the common aperture, and an exit face oriented toward the third main face, a texture of the first functional planar textured plate forming all of said motifs of submillimeter height and optionally wherein, for b), the vehicular luminous laminated glazed roof includes a second planar functional textured plate that is partially textured in its thickness, which includes a second entrance face oriented toward the exit face of the first textured plate, and said exit face oriented toward the third main face, is textured, the texture of the second planar functional textured plate forming a set of motifs of submillimeter height.

16. The vehicular luminous laminated glazed roof as claimed in claim 2, wherein the peripheral extension is spaced apart by at most 2 mm or makes contact with the lamination interlayer.

17. The vehicular luminous laminated glazed roof as claimed in claim 8, wherein the two-dimensional motifs are cones or pyramidal motifs, or prisms.

18. A process for manufacturing the roof as claimed in claim 1, comprising:
    cutting a PVB sheet or a composite sheet consisting of a PVB sheet/film of functional plastic or of a PVB sheet/film of functional plastic/PVB sheet, to form the one or more apertures; and
    assembling the laminated glazing, with the inorganic light-emitting diodes in one or more apertures that are larger than the size of the inorganic light-emitting diodes and even than the surround or peripheral extension of each collimating optics.

19. The process for manufacturing the roof as claimed in claim 18, wherein the one or more inorganic light-emitting diodes are surface mount devices that are mounted on a face of a flexible diode carrier.

20. The process for manufacturing the roof as claimed in claim 18, wherein the or each collimating optics is a plate textured with an array of two-dimensional motifs or is a prismatic assembly including a first prismatic array oriented toward the third main face extending longitudinally along an axis, and including a second prismatic array that is crossed with the first prismatic array.

\* \* \* \* \*